US006983446B2

(12) United States Patent
Charisius et al.

(10) Patent No.: US 6,983,446 B2
(45) Date of Patent: Jan. 3, 2006

(54) METHODS AND SYSTEMS FOR FINDING SPECIFIC LINE OF SOURCE CODE

(75) Inventors: Dietrich Charisius, Stuttgart (DE); Alexander Aptus, Esslingen (DE)

(73) Assignee: Borland Software Corporation, Scotts Valley, CA (US)

( * ) Notice: Subject to any disclaimer, the term of this patent is extended or adjusted under 35 U.S.C. 154(b) by 805 days.

(21) Appl. No.: 09/839,525

(22) Filed: Apr. 20, 2001

(65) Prior Publication Data

US 2002/0023257 A1 Feb. 21, 2002

Related U.S. Application Data

(63) Continuation-in-part of application No. 09/680,063, filed on Oct. 4, 2000.
(60) Provisional application No. 60/199,046, filed on Apr. 21, 2000, provisional application No. 60/157,826, filed on Oct. 5, 1999, and provisional application No. 60/199,046, filed on Apr. 21, 2000.

(51) Int. Cl.
 *G06F 9/44* (2006.01)

(52) U.S. Cl. ...................................... 717/113; 345/522
(58) Field of Classification Search ......... 717/106–113, 717/120–133, 140–161; 345/522, 700
See application file for complete search history.

(56) References Cited

U.S. PATENT DOCUMENTS

| 5,410,648 A | * | 4/1995 | Pazel | 717/124 |
| 5,918,053 A | * | 6/1999 | Graham | 717/127 |
| 6,473,896 B1 | * | 10/2002 | Hicken et al. | 717/132 |

FOREIGN PATENT DOCUMENTS

| EP | 1 030 242 A2 | 8/2000 |
| EP | 1 030 252 A1 | 8/2000 |

OTHER PUBLICATIONS

James Martin, "Principles of Object–Oriented Analysis and Design," Prentice Hall, Oct. 29, 1992, Chapters 1–22.
M.M. Burnett, et al., "Visual Object–Oriented Programming Concepts and Environments," Manning Publishing, 1994, Chapters 1–12.
Erich Gamma, et al., "Design Patterns Elements of Reusable Object–Oriented Software," Addison–Wesley, 1994, Chapter 1.
Wayne Citrin, et al., "A Formal Definition of Control Semantics in a Completely Visual Language," Sep. 1993, Mac World.
RR Software Inc., "Janus/ADA 95 Compiler User Manual," Version 5.1 Dec. 1995, pp. 6–1 to 6–48.
F. Penz, "Visual Programming in the ObjectWorld," Journal of Visual Languages and Computing, Mar. 1991, vol. 2, p. 17–41.
L. Vanhelsuwe, "Mastering JAVABEANS," Sybex, Chapter 2.
David Withey McIntrye, "A Visual Method for Generating Iconic Programming Environments," UMI Dissertation Services.

* cited by examiner

*Primary Examiner*—Todd Ingberg
*Assistant Examiner*—Lawrence Shrader
(74) *Attorney, Agent, or Firm*—MacCord Mason PLLC

(57) ABSTRACT

Methods and systems consistent with the present invention provide an improved software development tool that allows a developer to locate a portion of source code corresponding to a message from a verification tool. The improved software development tool displays a graphical representation of the portion of the source code corresponding to the message in a visually distinctive manner.

268 Claims, 27 Drawing Sheets

METHODS AND SYSTEMS FOR FINDING SPECIFIC LINE OF SOURCE CODE

CROSS-REFERENCE TO RELATED APPLICATIONS

This application claims the benefit of the filing date of U.S. Provisional Application No. 60/199,046, entitled "Software Development Tool," filed on Apr. 21, 2000, and is a continuation-in-part of U.S. patent application Ser. No. 09/680,063, entitled "Method and System for Developing Software," filed on Oct. 4, 2000, which claims the benefit of the filing date of U.S. Provisional Application No. 60/157,826, entitled "Visual Unified Modeling Language Development Tool," filed on Oct. 5, 1999, and U.S. Provisional Application No. 60/199,046, entitled "Software Development Tool," filed on Apr. 21, 2000; all of which are incorporated herein by reference.

The following identified U.S. patent applications are also relied upon and are incorporated by reference in this application:

U.S. patent application Ser. No. 09/680,065, entitled "Method And System For Displaying Changes Of Source Code," filed on Oct. 4, 2000;

U.S. patent application Ser. No. 09/680,030, entitled "Method And System For Generating, Applying, And Defining A Pattern," filed on Oct. 4, 2000;

U.S. patent application Ser. No. 09/680,064, entitled "Method And System For Collapsing A Graphical Representation Of Related Elements," filed on Oct. 4, 2000;

U.S. patent application Ser. No. 09/839,045, entitled "Methods and Systems for Generating Source Code for Object Oriented Elements," and filed on the same date herewith;

U.S. patent application Ser. No. 09/839,526, entitled "Methods and Systems for Relating Data Structures and Object Oriented Elements for Distributed Computing," and filed on the same date herewith;

U.S. patent application Ser. No. 09/839,645, entitled "Methods and Systems for Finding and Displaying Linked Objects," and filed on the same date herewith;

U.S. patent application Ser. No. 09/839,527, entitled "Methods and Systems for Animating the Interaction of Objects in an Object Oriented Program," and filed on the same date herewith;

U.S. patent application Ser. No. 09/839,646, entitled "Methods and Systems for Supporting and Deploying Distributed Computing Components," and filed on the same date herewith;

U.S. patent application Ser. No. 09/838,580, entitled "Diagrammatic Control of a Software in a Version Control System," and filed on the same date herewith;

U.S. patent application Ser. No. 09/838,578, entitled "Navigation Links in Generated Documentation," and filed on the same date herewith;

U.S. patent application Ser. No. 09/839,644, entitled "Methods and Systems for Identifying Dependencies Between Object-Oriented Elements," and filed on the same date herewith; and U.S. patent application Ser. No. 09/839,524, entitled "Methods and Systems for Relating a Data Definition File and a Data Model for Distributed Computing," and filed on the same date herewith.

FIELD OF THE INVENTION

The present invention relates to a method and system for developing software. More particularly, the invention relates to a method and system for locating source code corresponding to a message from a verification tool.

BACKGROUND OF THE INVENTION

Computer instructions are written in source code. Although a skilled programmer can understand source code to determine what the code is designed to accomplish, with highly complex software systems, a graphical representation or model of the source code is helpful to organize and visualize the structure and components of the system. Using models, the complex systems are easily identified, and the structural and behavioral patterns can be visualized and documented.

The well-known Unified Modeling Language (UML) is a general-purpose notational language for visualizing, specifying, constructing, and documenting complex software systems. UML is used to model systems ranging from business information systems to Web-based distributed systems, to real-time embedded systems. UML formalizes the notion that real-world objects are best modeled as self-contained entities that contain both data and functionality. UML is more clearly described in the following references, which are incorporated herein by reference: (1) Martin Fowler, *UML Distilled Second Edition: Applying the Standard Object Modeling Language*, Addison-Wesley (1999); (2) Booch, Rumbaugh, and Jacobson, *The Unified Modeling Language User Guide*, Addison-Wesley (1998); (3) Peter Coad, Jeff DeLuca, and Eric Lefebvre, *Java Modeling in Color with UML: Enterprise Components and Process*, Prentice Hall (1999); and (4) Peter Coad, Mark Mayfield, and Jonathan Kern, *Java Design: Building Better Apps & Applets* (2nd Ed.), Prentice Hall (1998).

As shown in FIG. 1, conventional software development tools 100 allow a programmer to view UML 102 while viewing source code 104. The source code 104 is stored in a file, and a reverse engineering module 106 converts the source code 104 into a representation of the software project in a database or repository 108. The software project comprises source code 104 in at least one file which, when compiled, forms a sequence of instructions to be run by the data processing system. The repository 108 generates the UML 102. If any changes are made to the UML 102, they are automatically reflected in the repository 108, and a code generator 110 converts the representation in the repository 108 into source code 104. Such software development tools 100, however, do not synchronize the displays of the UML 102 and the source code 104. Rather, the repository 108 stores the representation of the software project while the file stores the source code 104. A modification in the UML 102 does not appear in the source code 104 unless the code generator 110 re-generates the source code 104 from the data in the repository 108. When this occurs, the portion of the source code 104 that is not protected from being overwritten is rewritten. Similarly, any modifications made to the source code 104 do not appear in the UML 102 unless the reverse engineering module 106 updates the repository 108. As a result, redundant information is stored in the repository 108 and the source code 104. In addition, rather than making incremental changes to the source code 104, conventional software development tools 100 rewrite the overall source code 104 when modifications are made to the UML 102, resulting in wasted processing time. This type of manual, large-grained synchronization requires either human intervention, or a "batch" style process to try to keep the two views (the UML 102 and the source code 104) in sync. Unfortunately, this approach, adopted by many tools, leads to many undesirable side-effects; such as desired changes to the source code being overwritten by the tool. A further disadvantage with conventional software development tools 100 is that they are designed to only work in a single programming language. Thus, a tool 100 that is designed for Java™ programs cannot be utilized to develop a program in C++. There is a need in the art for a tool that avoids the limitations of these conventional software development tools.

SUMMARY OF THE INVENTION

Methods and systems consistent with the present invention provide an improved software development tool that overcomes the limitations of conventional software development tools. The improved software development tool of the present invention allows a developer to simultaneously view a graphical and a textual display of source code. The graphical and textual views are synchronized so that a modification in one view is automatically reflected in the other view. In addition, the software development tool is designed for use with more than one programming language.

The improved software development tool enables a developer to quickly determine the location of an error detected by a verification tool. Not only can the developer locate the specific line of source code, but the software development tool also displays the graphical representation of the source code corresponding to the message in a visually distinctive manner. This assists the developer in debugging the source code by allowing the developer to visually determine the location of the error.

In accordance with methods consistent with the present invention, a method is provided in a data processing system for developing source code. The method comprises the steps of receiving a message corresponding to a portion of the source code, and displaying the graphical representation of the portion of the source code corresponding to the message in a visually distinctive manner.

In accordance with methods consistent with the present invention, a method is provided in a data processing system for developing source code. The method comprises the steps of detecting an error in the source code, generating a message reflecting the error, and displaying the graphical representation of the portion of the source code corresponding to the message in a visually distinctive manner.

In accordance with articles of manufacture consistent with the present invention, a computer-readable medium is provided. The computer-readable medium contains instructions for controlling a data processing system to perform a method. The data processing system has source code. The method comprises the steps of receiving a message corresponding to a portion of the source code, and displaying the graphical representation of the portion of the source code corresponding to the message in a visually distinctive manner.

In accordance with articles of manufacture consistent with the present invention, a computer-readable medium is provided. The computer-readable medium contains instructions for controlling a data processing system to perform a method. The data processing system has source code. The method comprises the steps of detecting an error in the source code, generating a message reflecting the error, and displaying the graphical representation of the portion of the source code corresponding to the message in a visually distinctive manner.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Methods and systems consistent with the present invention provide an improved software development tool that creates a graphical representation of source code regardless of the programming language in which the code is written. In addition, the software development tool simultaneously reflects any modifications to the source code to both the display of the graphical representation as well as the textual display of the source code.

Figure 1:
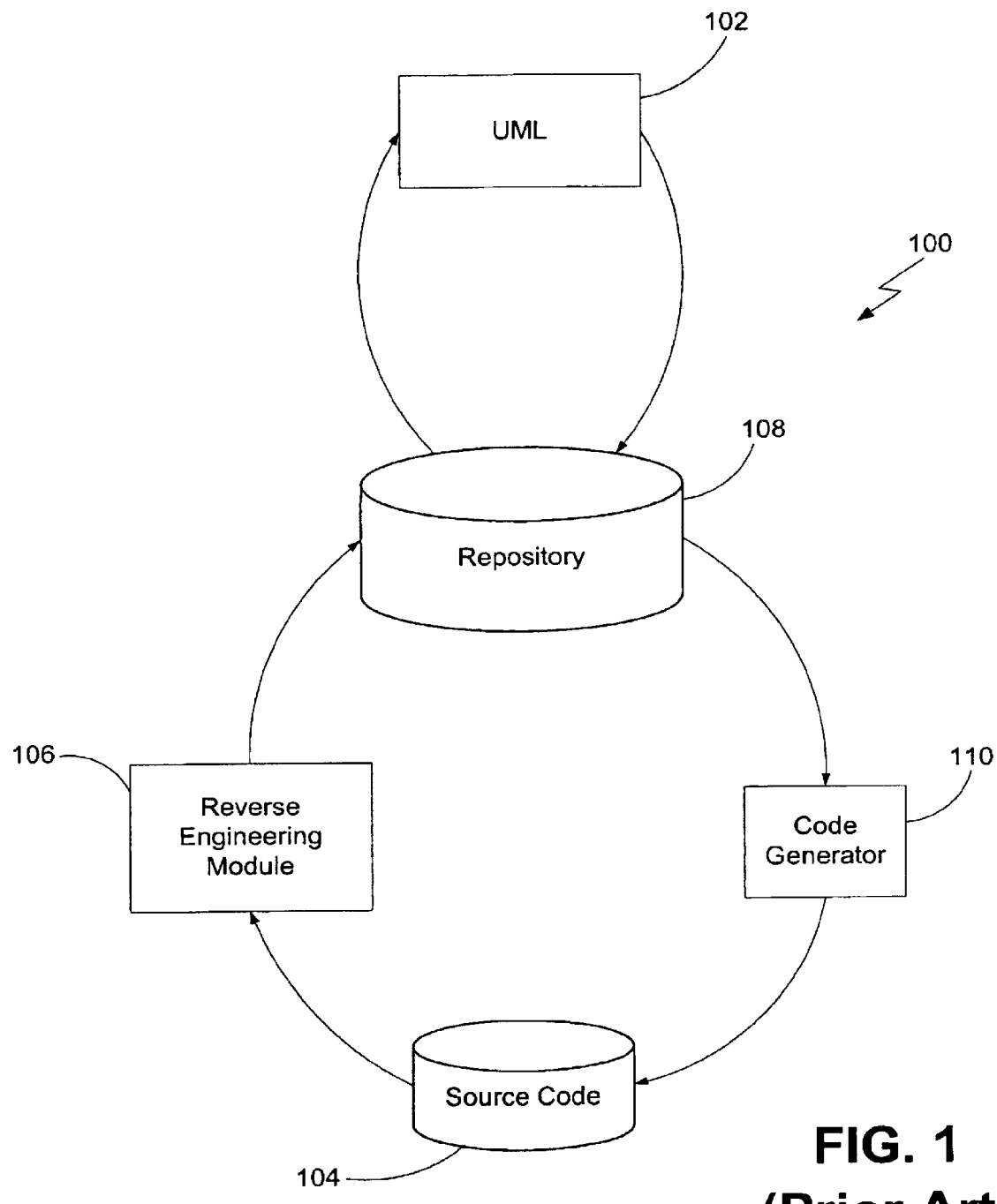
FIG. 1 depicts a conventional software development tool.
Figure 2:
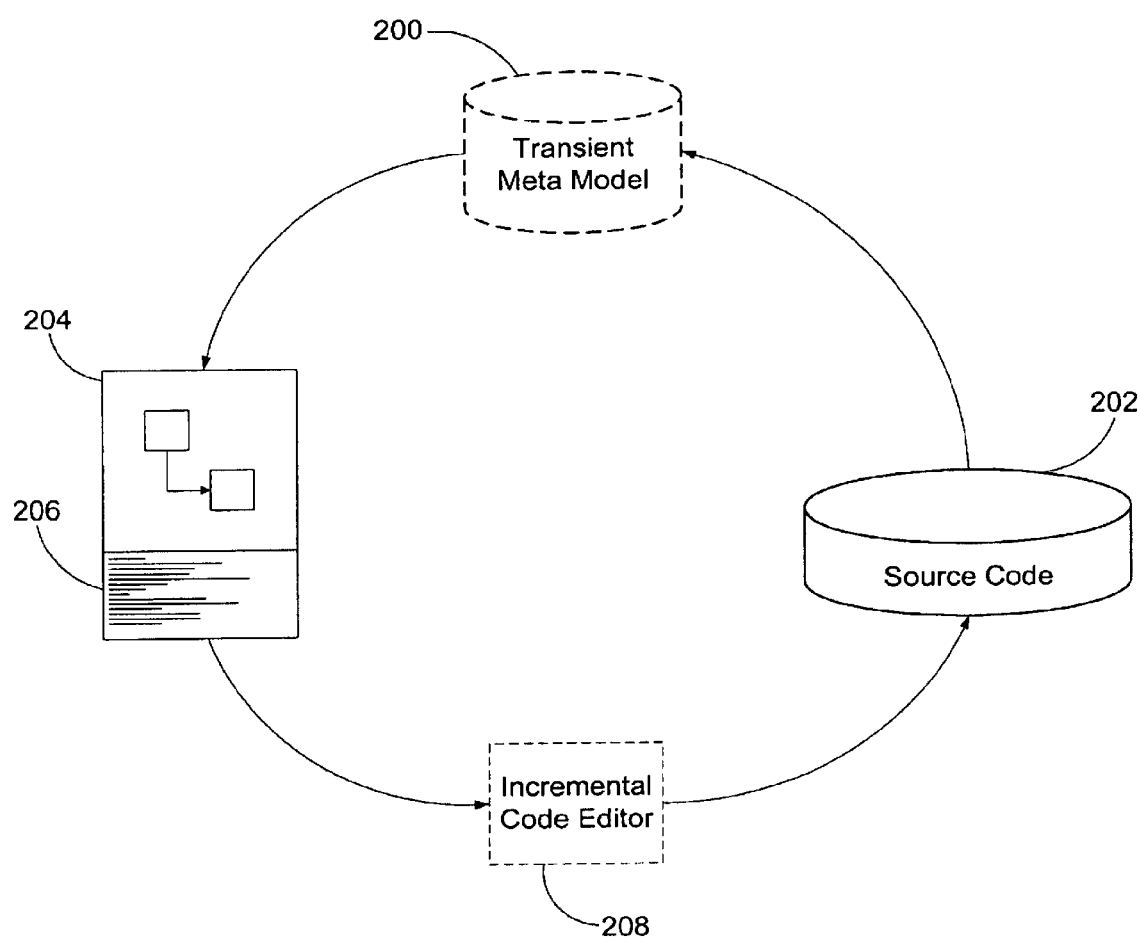
FIG. 2 depicts an overview of a software development tool in accordance with methods and systems consistent with the present invention.

As depicted in FIG. 2, source code 202 is being displayed in both a graphical form 204 and a textual form 206. In accordance with methods and systems consistent with the present invention, the improved software development tool generates a transient meta model (TMM) 200 which stores a language-neutral representation of the source code 202. The graphical 204 and textual 206 representations of the source code 202 are generated from the language-neutral representation in the TMM 200. Alternatively, the textual view 206 of the source code may be obtained directly from the source code file. Although modifications made on the displays 204 and 206 may appear to modify the displays 204 and 206, in actuality all modifications are made directly to the source code 202 via an incremental code editor (ICE) 208, and the TMM 200 is used to generate the modifications in both the graphical 204 and the textual 206 views from the modifications to the source code 202.

The improved software development tool provides simultaneous round-trip engineering, i.e., the graphical representation 204 is synchronized with the textual representation 206. Thus, if a change is made to the source code 202 via the graphical representation 204, the textual representation 206 is updated automatically. Similarly, if a change is made to the source code 202 via the textual representation 206, the graphical representation 204 is updated to remain synchronized. There is no repository, no batch code generation, and no risk of losing code.

Figure 3:
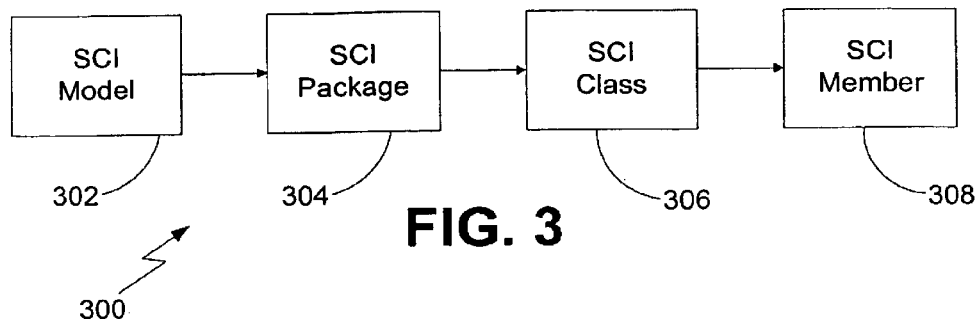
FIG. 3 depicts a data structure of the language-neutral representation created by the software development tool of FIG. 2.

The data structure 300 of the language-neutral representation is depicted in FIG. 3. The data structure 300 comprises a Source Code Interface (SCI) model 302, an SCI package 304, an SCI class 306, and an SCI member 308. The SCI model 302 is the source code organized into packages. The SCI model 302 corresponds to a directory for a software project being developed by the user, and the SCI package 304 corresponds to a subdirectory. The software project comprises the source code in at least one file that is compiled to form a sequence of instructions to be run by a data processing system. The data processing system is discussed in detail below. As is well known in object-oriented programming, the class 306 is a category of objects which describes a group of objects with similar properties (attributes), common behavior (operations or methods), common relationships to other objects, and common semantics. The members 308 comprise attributes and/or operations.

Figure 4:
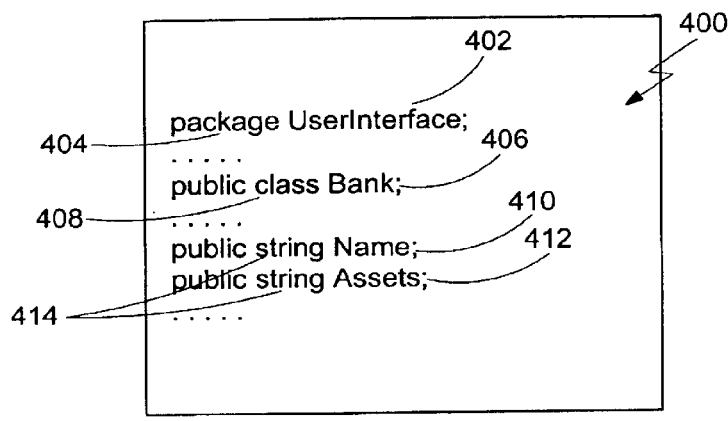
FIG. 4 depicts representative source code.
Figure 5:
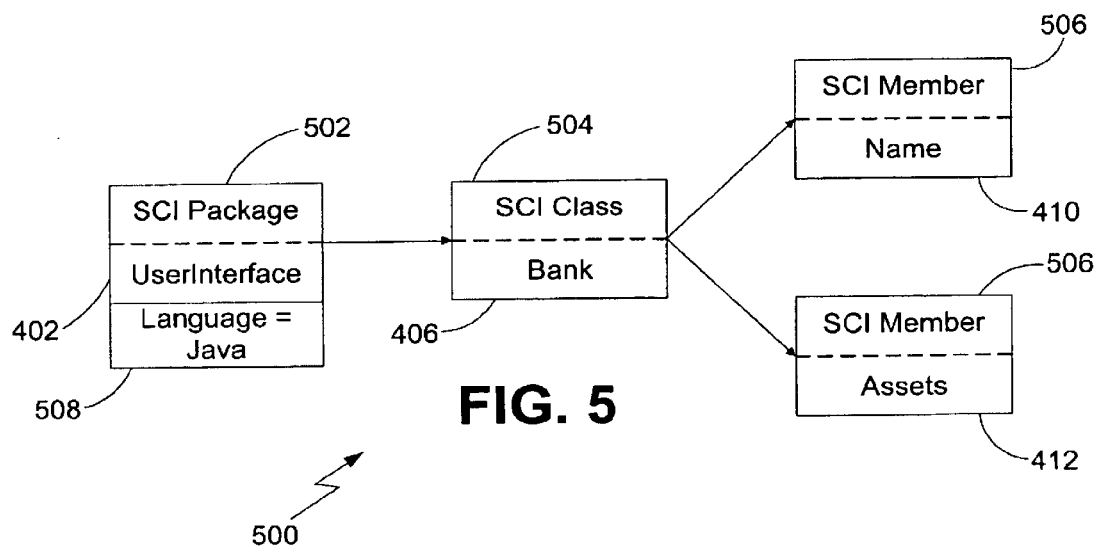
FIG. 5 depicts the data structure of the language-neutral representation of the source code of FIG. 4.

For example, the data structure 500 for the source code 400 depicted in FIG. 4 is depicted in FIG. 5. UserInterface 402 is defined as a package 404. Accordingly, UserInterface 402 is contained in SCI package 502. Similarly, Bank 406, which is defined as a class 408, is contained in SCI class 504, and Name 410 and Assets 412, which are defined as attributes (strings 414), are contained in SCI members 506. Since these elements are in the same project, all are linked. The data structure 500 also identifies the language in which the source code is written 508, e.g., the Java™ programming language.

Figure 6:
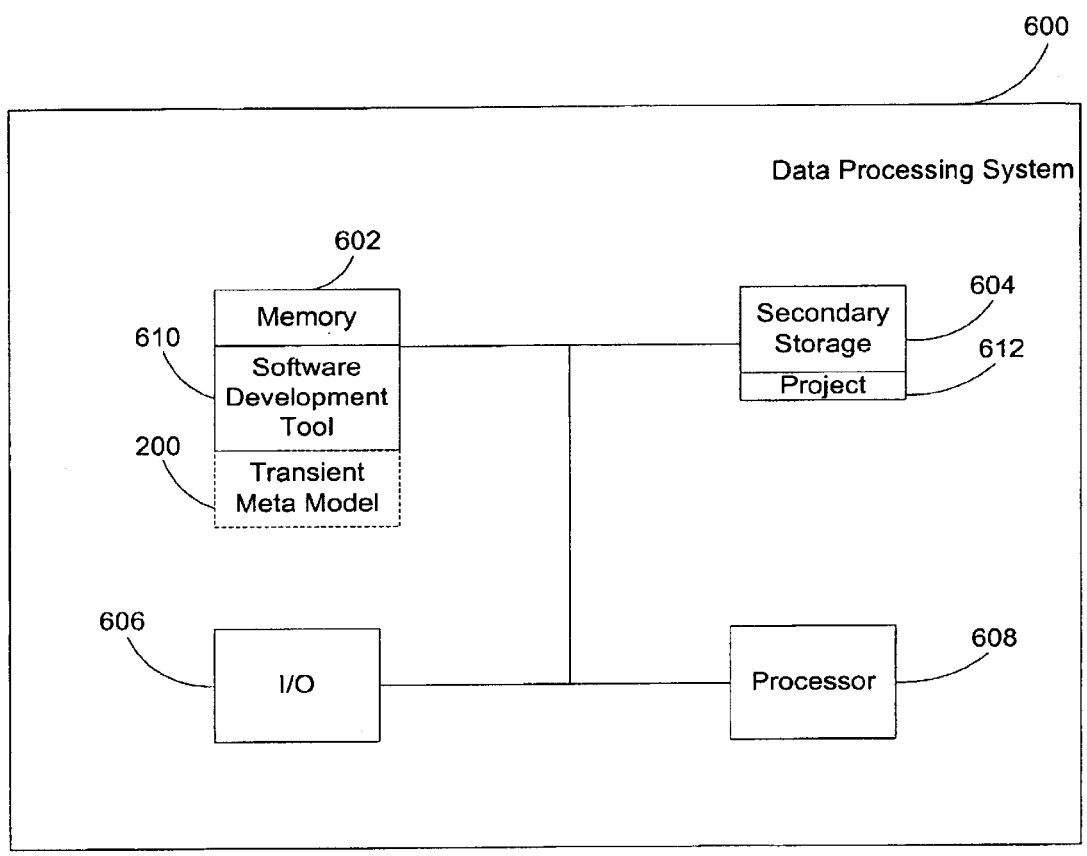
FIG. 6 depicts a data processing system suitable for practicing the present invention.

FIG. 6 depicts a data processing system 600 suitable for practicing methods and systems consistent with the present invention. Data processing system 600 comprises a memory 602, a secondary storage device 604, an I/O device 606, and a processor 608. Memory 602 includes the improved software development tool 610. The software development tool 610 is used to develop a software project 612, and create the TMM 200 in the memory 602. The project 612 is stored in the secondary storage device 604 of the data processing system 600. One skilled in the art will recognize that data processing system 600 may contain additional or different components.

Although aspects of the present invention are described as being stored in memory, one skilled in the art will appreciate that these aspects can also be stored on or read from other types of computer-readable media, such as secondary storage devices, like hard disks, floppy disks or CD-ROM; a carrier wave from a network, such as Internet; or other forms of RAM or ROM either currently known or later developed.

Figure 7:
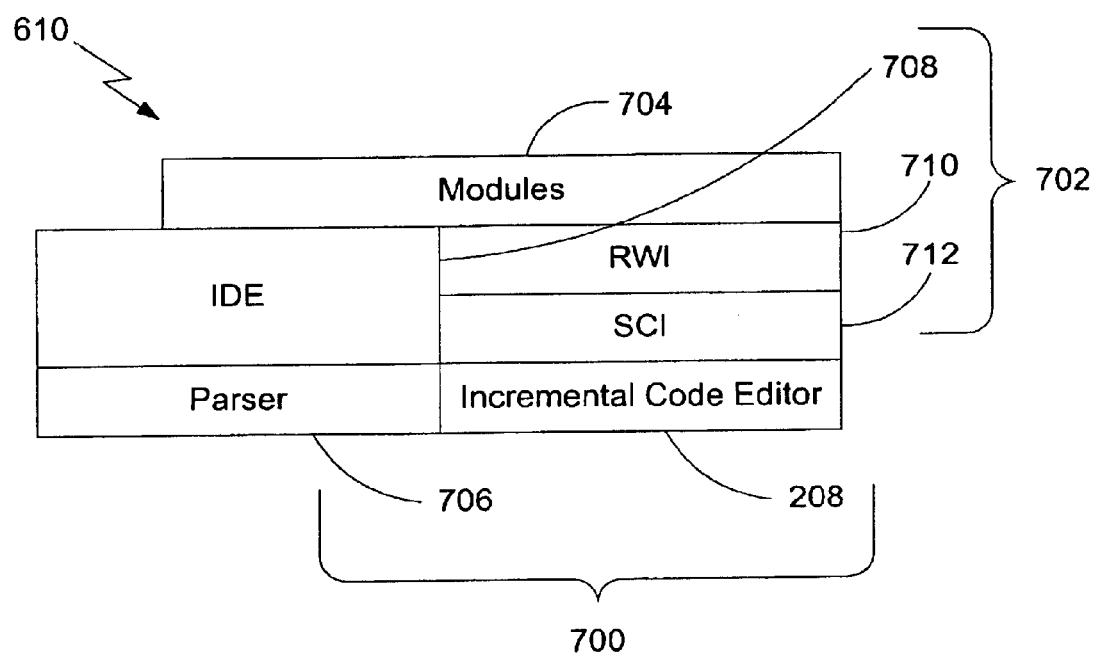
FIG. 7 depicts an architectural overview of the software development tool of FIG. 2.

FIG. 7 illustrates an architectural overview of the improved software development tool 610. The tool 610 comprises a core 700, an open application program interface (API) 702, and modules 704. The core 700 includes a parser 706 and an ICE 208. The parser 706 converts the source code into the language-neutral representation in the TMM, and the ICE 208 converts the text from the displays into source code. There are three main packages composing the API 702: Integrated Development Environment (IDE) 708; Read-Write Interface (RWI) 710; and Source Code Interface (SCI) 712. Each package includes corresponding subpackages. As is well known in the art, a package is a collection of attributes, notifications, operations, or behaviors that are treated as a single module or program unit.

IDE 708 is the API 702 needed to generate custom outputs based on information contained in a model. It is a read-only interface, i.e., the user can extract information from the model, but not change the model. IDE 708 provides the functionality related to the model's representation in IDE 708 and interaction with the user. Each package composing the IDE group has a description highlighting the areas of applicability of this concrete package. RWI 710 enables the user to go deeper into the architecture. Using RWI 710, information can be extracted and written to the models. RWI not only represents packages, classes and members, but it may also represent different diagrams (class diagrams, use case diagrams, sequence diagrams and others), links, notes, use cases, actors, states, etc.

SCI 712 is at the source code level, and allows the user to work with the source code almost independently of the language being used.

The improved software development tool of the present invention is used to develop source code in a project. The project comprises a plurality of files and the source code of a chosen one of the plurality of files is written in a given language. The software development tool determines the language of the source code of the chosen file, converts the source code from the language into a language-neutral representation, uses the language-neutral representation to textually display the source code of the chosen file in the language, and uses the language-neutral representation to display a graphical representation of at least a portion of the project. The source code and the graphical representation are displayed simultaneously.

The improved software development tool of the present invention is also used to develop source code. The software development tool receives an indication of a selected language for the source code, creates a file to store the source code in the selected language, converts the source code from the selected language into a language-neutral representation, uses the language-neutral representation to display the source code of the file, and uses the language-neutral representation to display a graphical representation of the file. Again, the source code and the graphical representation are displayed simultaneously.

Moreover, if the source code in the file is modified, the modified source code and a graphical representation of at least a portion of the modified source code are displayed simultaneously. The QA module of the software development tool provides an error message if the modification does not conform to predefined or user-defined styles, as described above. The modification to the source code may be received by the software development tool via the programmer editing the source code in the textual pane or the graphical pane, or via some other independent software tool that the programmer uses to modify the code. The graphical representation of the project may be in Unified Modeling Language; however, one skilled in the art will recognize that other graphical representations of the source code may be displayed. Further, although the present invention is described and shown using the various views of the UML, one of ordinary skill in the art will recognize that other views may be displayed.

Figure 8A:
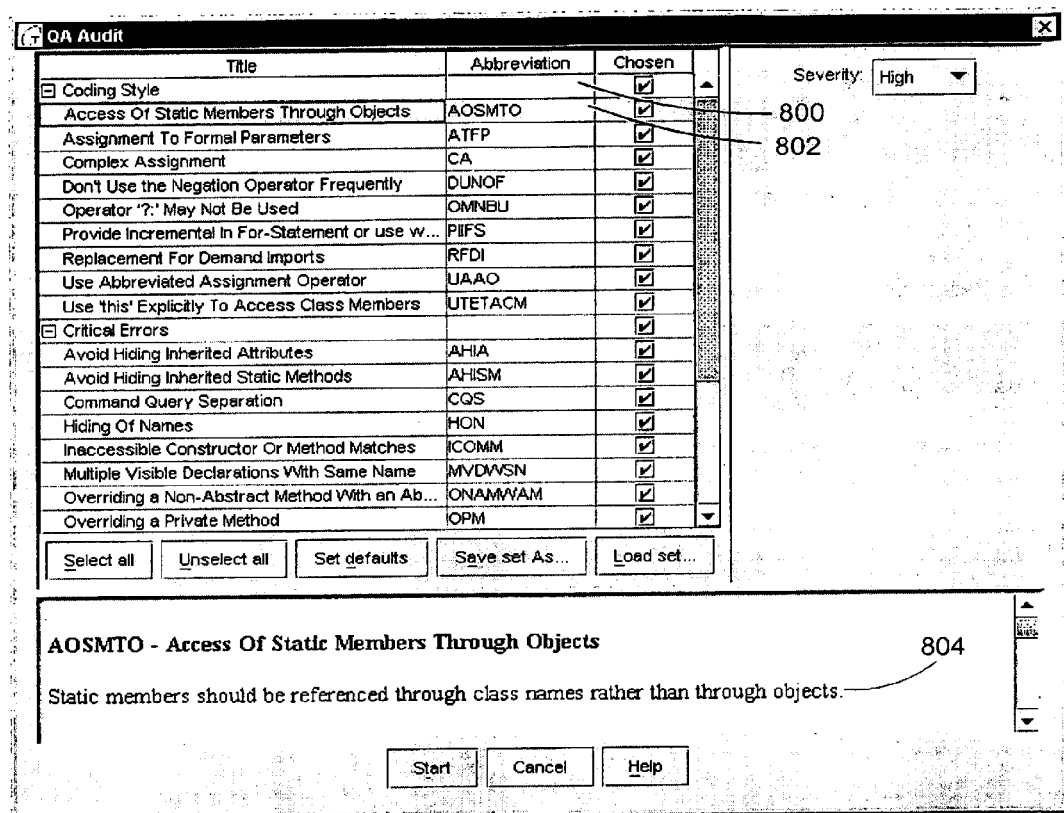
FIG. 8 depicts a flow diagram of the steps performed by the software development tool depicted in FIG. 2.
Figure 8B:
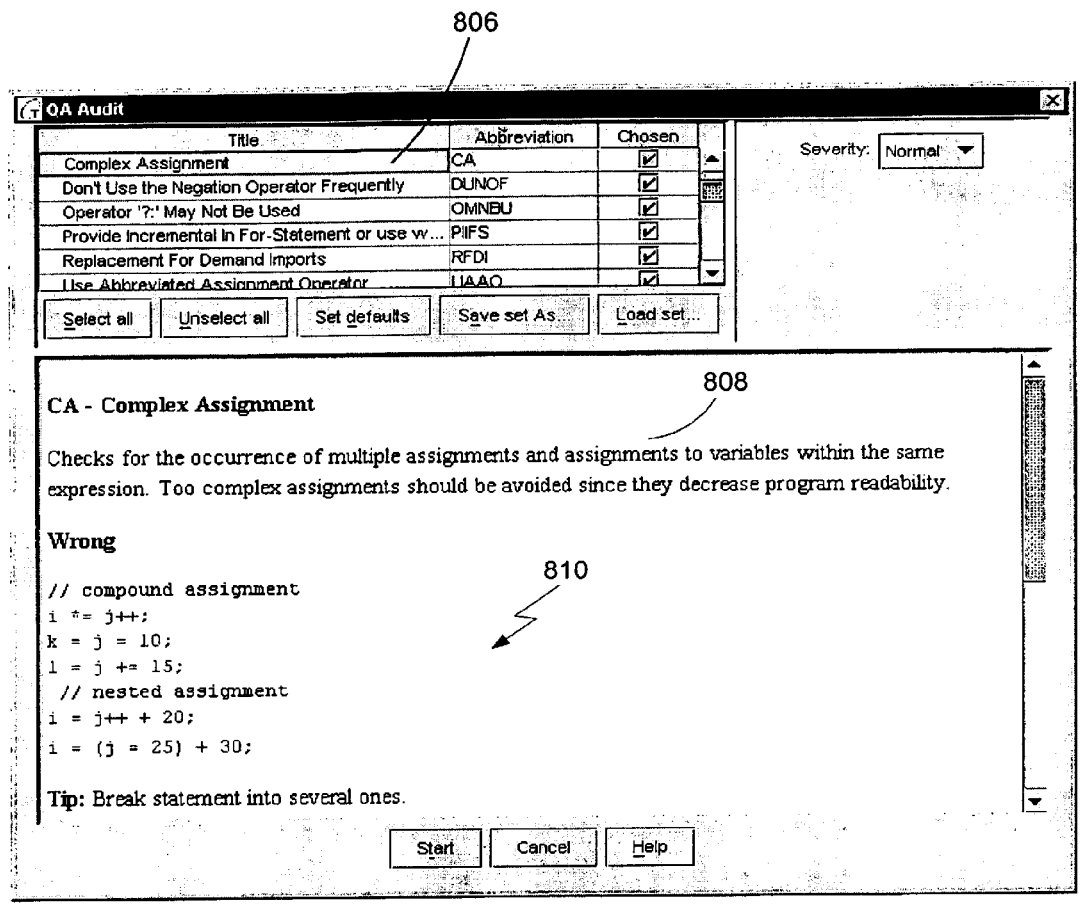
Figure 8C:
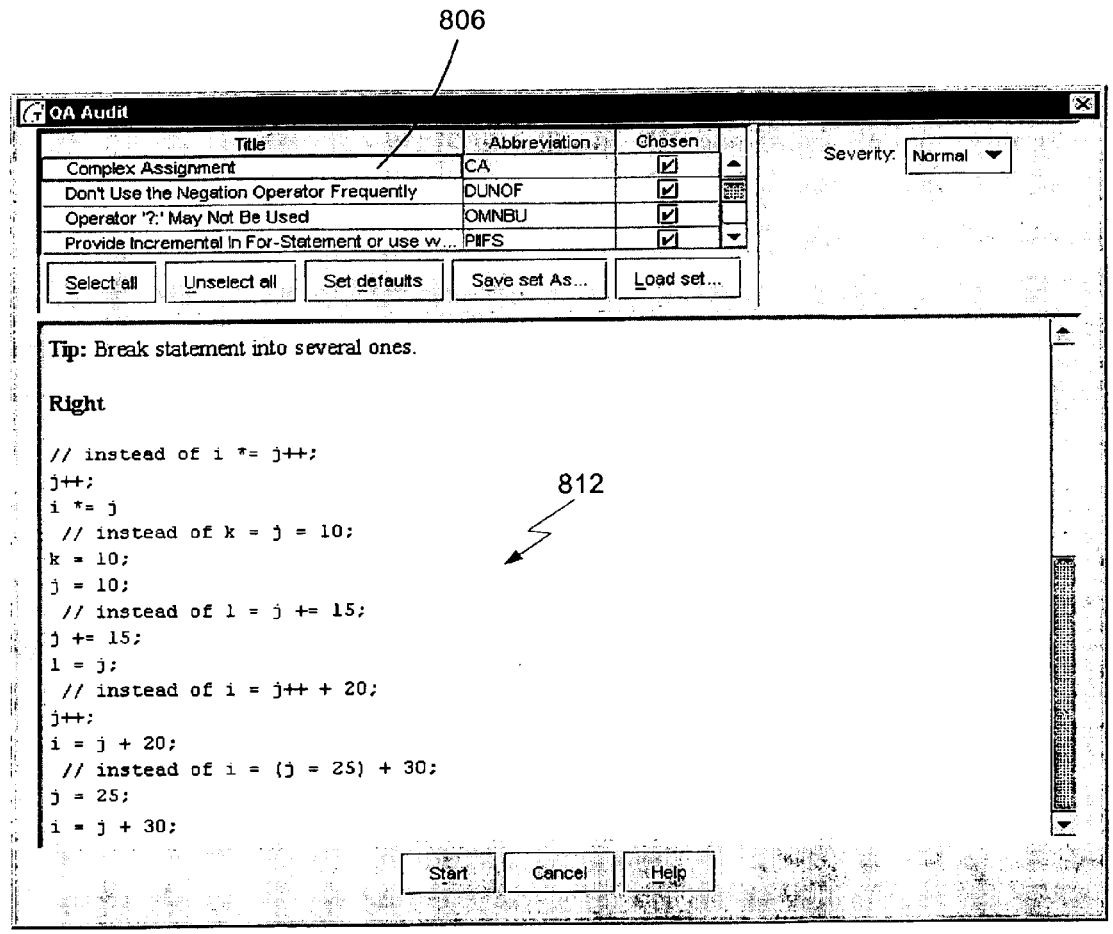

FIG. 8 depicts a flow diagram of the steps performed by the software development tool to develop a project in accordance with methods and systems consistent with the present invention. As previously stated, the project comprises a plurality of files. The developer either uses the software development tool to open a file that contains existing source code, or to create a file in which the source code will be developed. If the software development tool is used to open the file, determined in step 800, the software development tool initially determines the programming language in which the code is written (step 802). The language is identified by the extension of the file, e.g., "java" identifies source code written in the Java™ language, while ".cpp" identifies source code written in C++. The software development tool then obtains a template for the current programming language, i.e., a collection of generalized definitions for the particular language that can be used to build the data structure (step 804). For example, the templates used to define a new Java™ class contains a default name, e.g., "Class1," and the default code, "public class Class1 { }." Such templates are well known in the art. For example, the "Microsoft Foundation Class Library" and the "Microsoft Word Template For Business Use Case Modeling" are examples of standard template libraries from which programmers can choose individual template classes. The software development tool uses the template to parse the source code (step 806), and create the data structure (step 808). After creating the data structure or if there is no existing code, the software development tool awaits an event, i.e., a modification or addition to the source code by the developer (step 810). If an event is received and the event is to close the file (step 812), the file is saved (step 814) and closed (step 816). Otherwise, the software development tool performs the event (step 818), i.e., the tool makes the modification. The software development tool then updates the TMM or model (step 820), as discussed in detail below, and updates both the graphical and the textual views (step 822).

Figure 9:
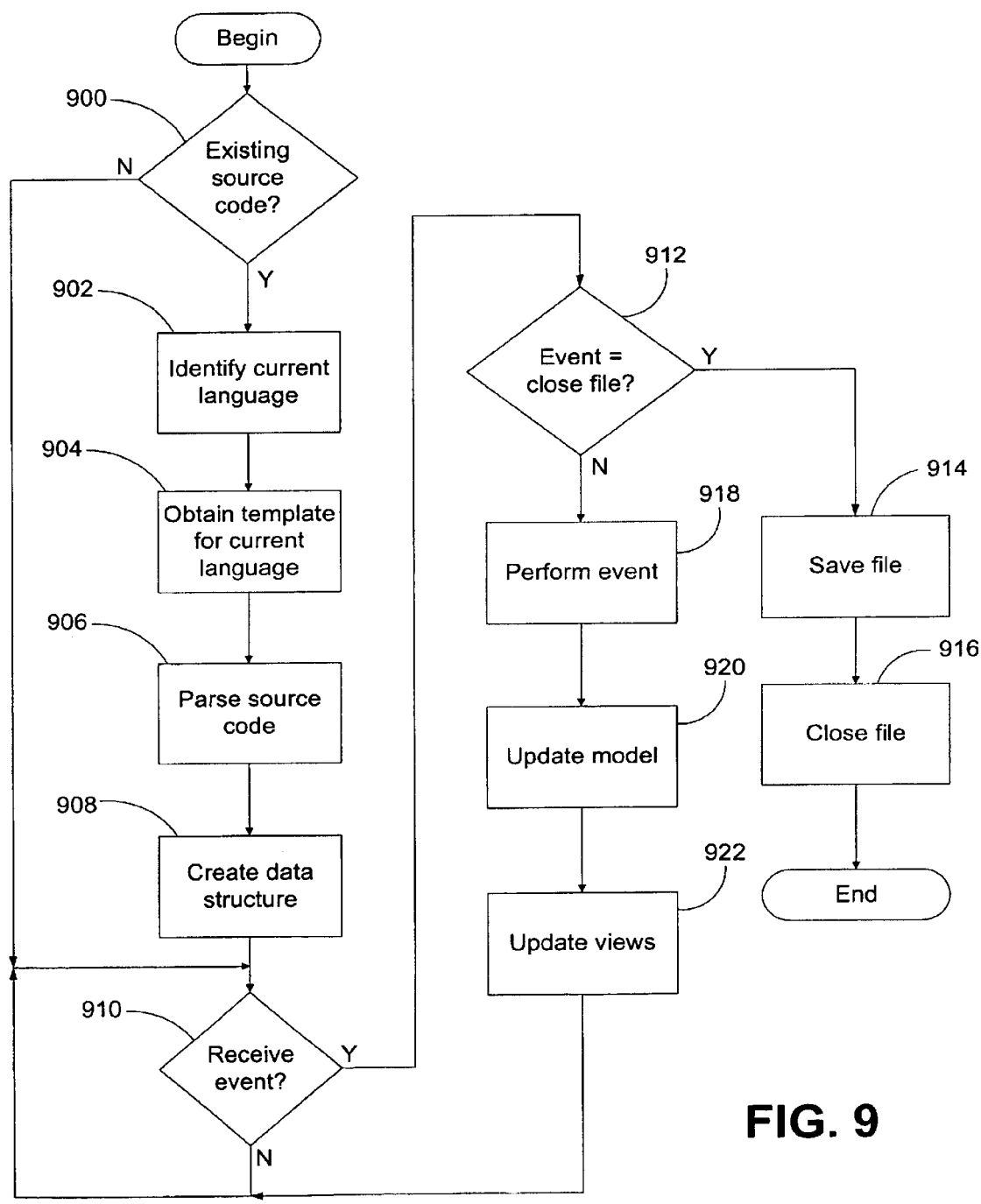
FIG. 9 depicts a flow diagram illustrating the update model step of FIG. 8.

FIG. 9 depicts a flow diagram illustrating the update model step of FIG. 8. The software development tool selects a file from the project (step 900), and determines whether the file is new (step 902), whether the file has been updated (step 904), or whether the file has been deleted (step 906). If the file is new, the software development tool adds the additional symbols from the file to the TMM (step 908). To add the symbol to the TMM, the software development tool uses the template to parse the symbol to the TMM. If the file has been updated, the software development tool updates the symbols in the TMM (step 910). Similar to the addition of a symbol to the TMM, the software development tool uses the template to parse the symbol to the TMM. If the file has been deleted, the software development tool deletes the symbols in the TMM (step 912). The software development tool continues this analysis for all files in the project. After all files are analyzed (step 914), any obsolete symbols in the TMM (step 916) are deleted (step 918).

Figure 10A:
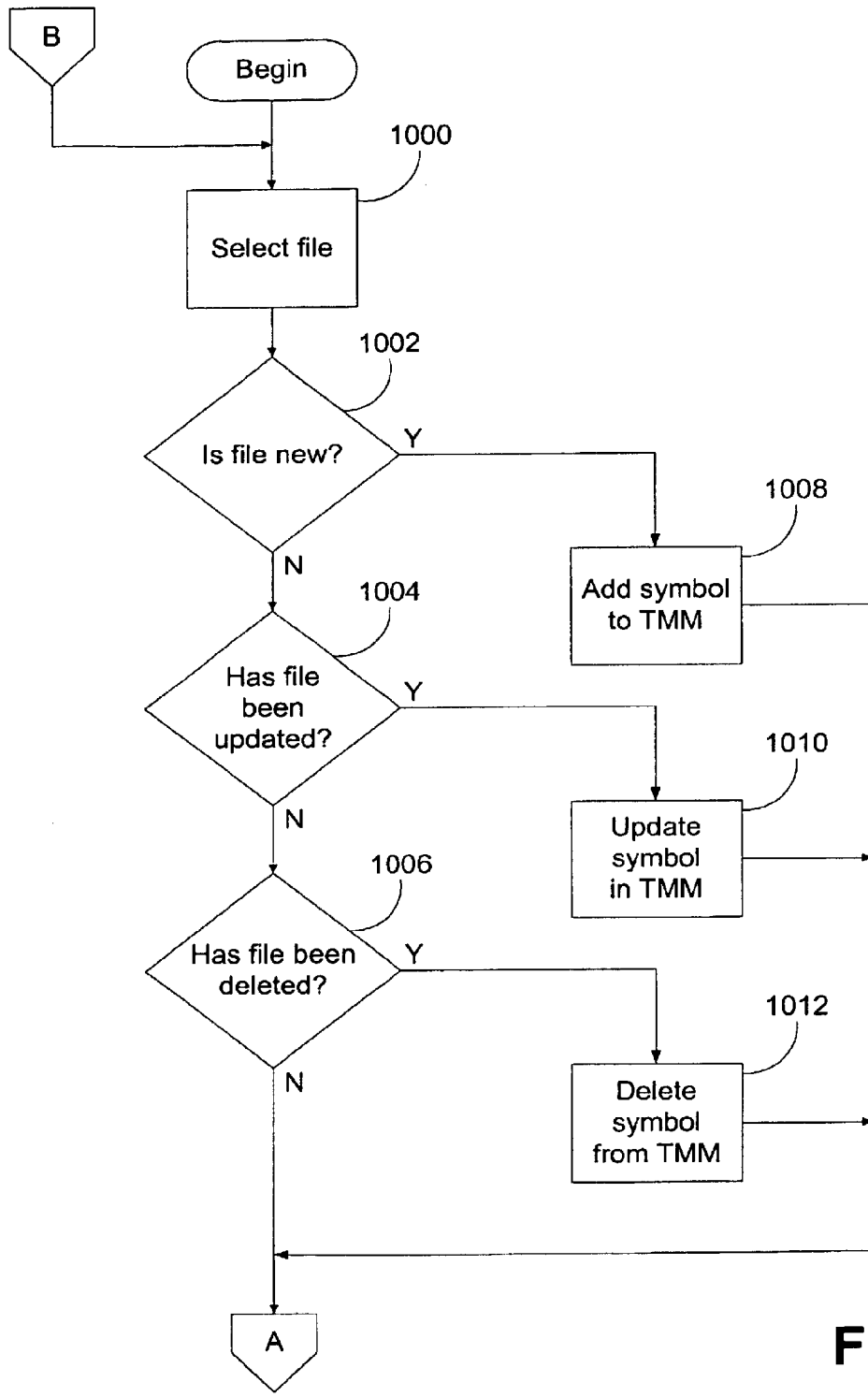
FIG. 10 depicts a flow diagram of the steps performed by the software development tool in FIG. 2 when creating a class.
Figure 10B:
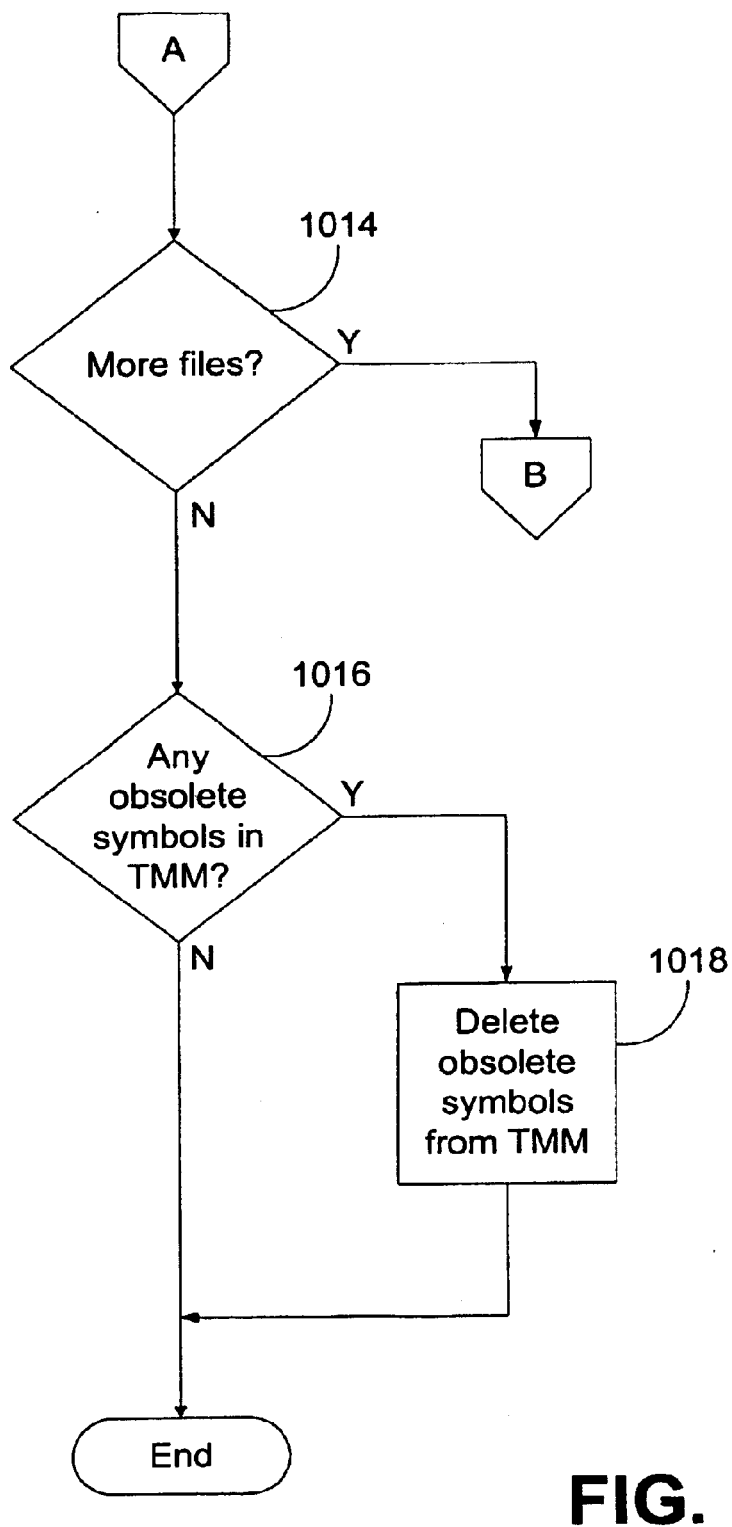

FIG. 10 depicts a flow diagram illustrating the performance of an event, specifically the creation of a class, in accordance with methods and systems consistent with the present invention. After identifying the programming language (step 1000), the software development tool obtains a template for the language (step 1002), creates a source code file in the project directory (step 1004), and pastes the template onto the TMM (step 1006). The project directory corresponds to the SCI model 302 of FIG. 3. Additional events which a developer may perform using the software development tool include the creation, modification or deletion of packages, projects, attributes, interfaces, links, operations, and the closing of a file.

Figure 11:
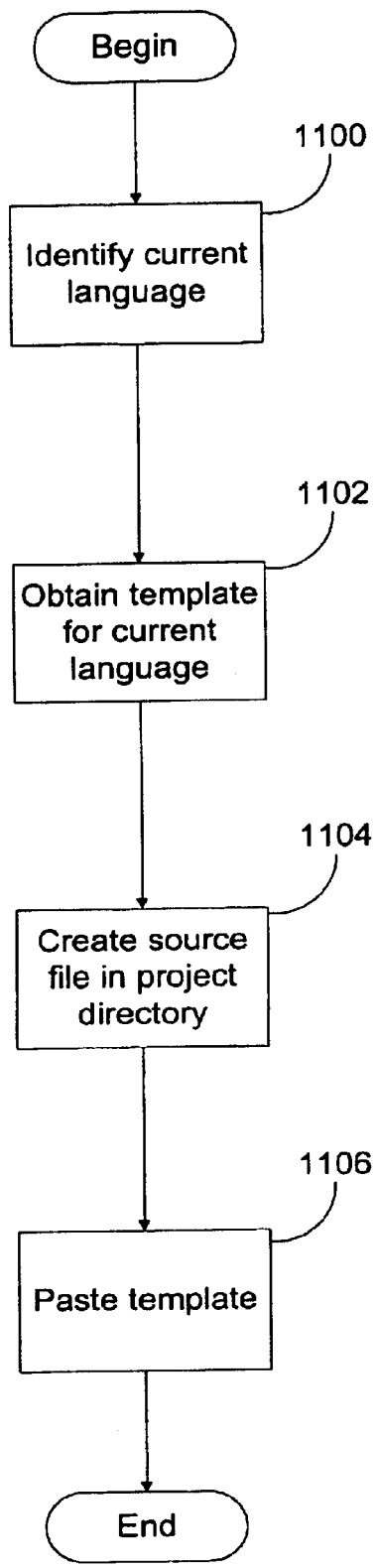
FIG. 11 depicts a user interface displayed by the software development tool depicted in FIG. 2, where the user interface displays a use case diagram of source code.
Figure 12:
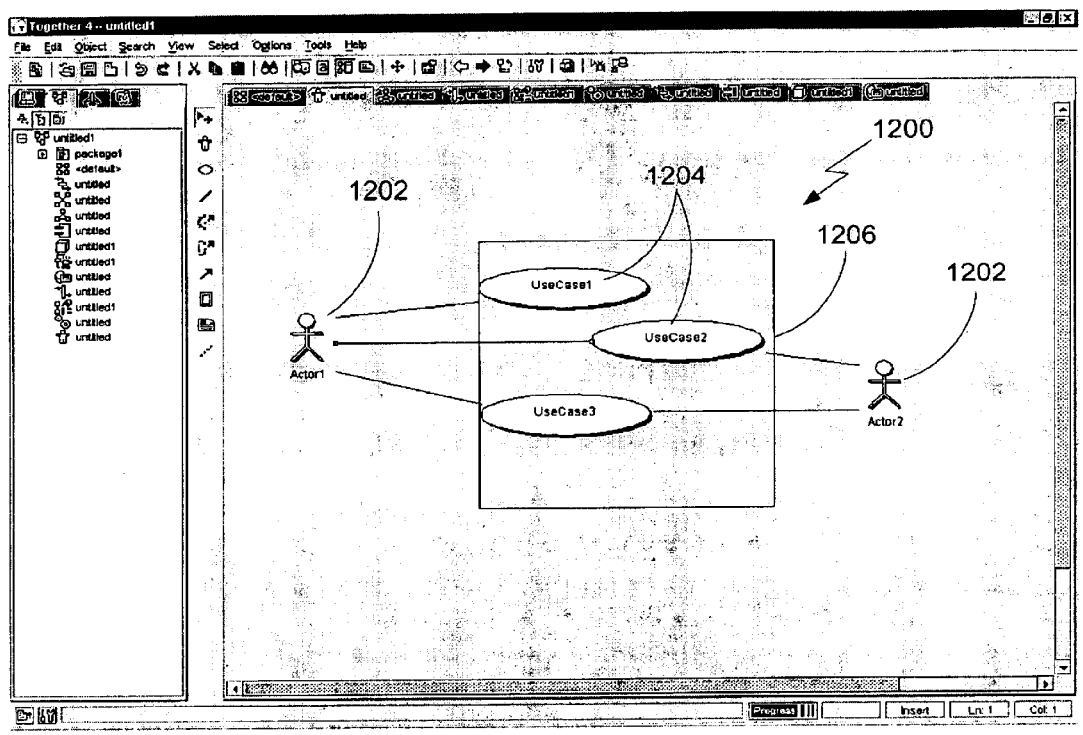
FIG. 12 depicts a user interface displayed by the software development tool depicted in FIG. 2, where the user interface displays both a class diagram and a textual view of source code.

Applications to be developed using the software development tool are collectively broken into three views of the application: the static view, the dynamic view, and the functional view. The static view is modeled using the use-case and class diagrams. A use case diagram 1100, depicted in FIG. 11, shows the relationship among actors 1102 and use cases 1104 within the system 1106. A class diagram 1200, depicted in FIG. 12 with its associated source code 1202, on the other hand, includes classes 1204, interfaces, packages and their relationships connected as a graph to each other and to their contents.

Figure 13:
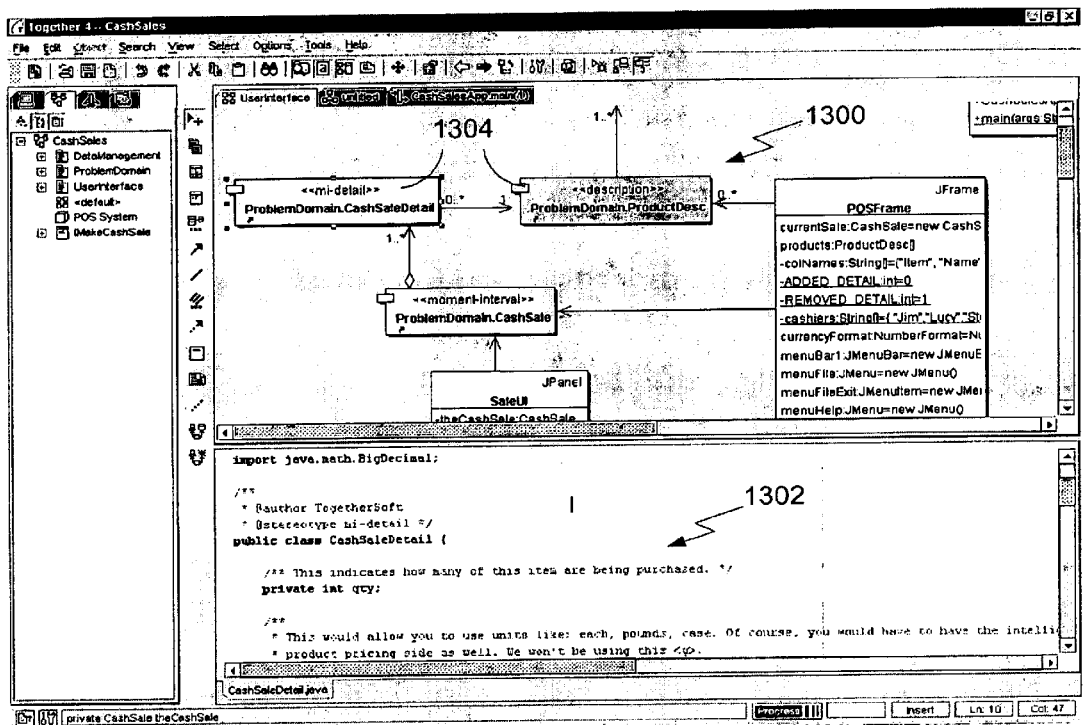
FIG. 13 depicts a user interface displayed by the software development tool depicted in FIG. 2, where the user interface displays a sequence diagram of source code.
Figure 14:
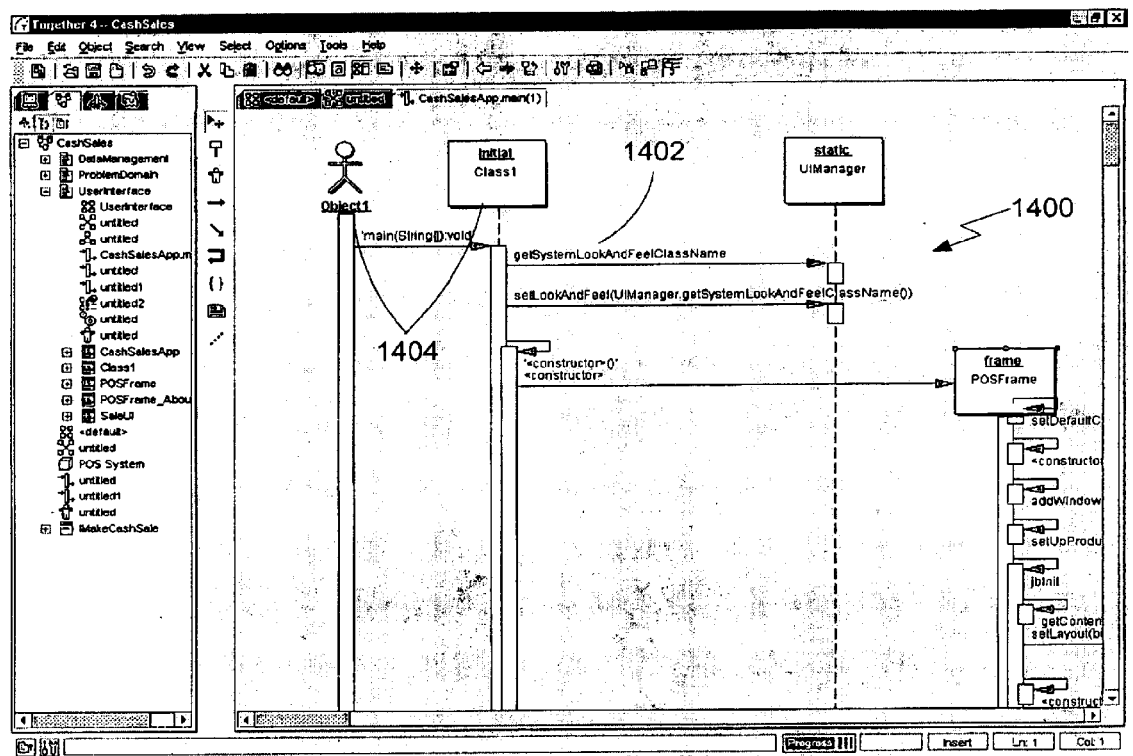
FIG. 14 depicts a user interface displayed by the software development tool depicted in FIG. 2, where the user interface displays a collaboration diagram of source code.
Figure 15:
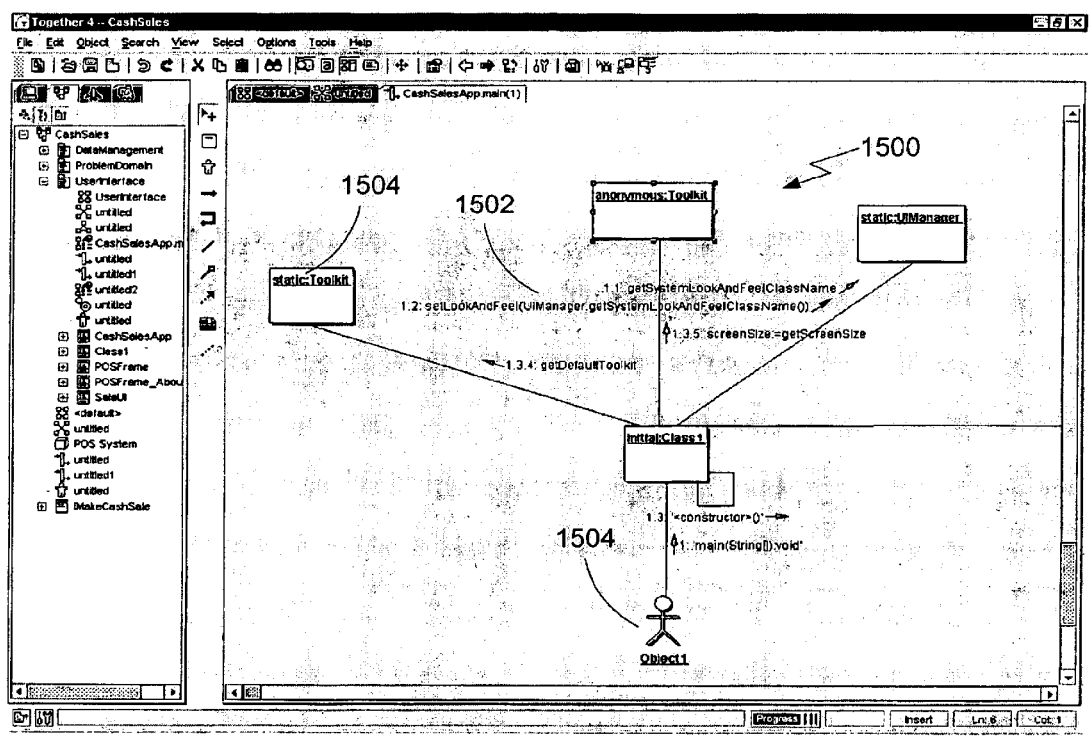
FIG. 15 depicts a user interface displayed by the software development tool depicted in FIG. 2, where the user interface displays a statechart diagram of source code.

The dynamic view is modeled using the sequence, collaboration and statechart diagrams. As depicted in FIG. 13, a sequence diagram 1300 represents an interaction, which is a set of messages 1302 exchanged among objects 1304 within a collaboration to effect a desired operation or result. In a sequence diagram 1300, the vertical dimension represents time and the horizontal dimension represents different objects. A collaboration diagram 1500, depicted in FIG. 15, is also an interaction with messages 1502 exchanged among objects 1504, but it is also a collaboration, which is a set of objects 1504 related in a particular context. Contrary to sequence diagrams 1300 (FIG. 13), which emphasize the time ordering of messages along the vertical axis, collaboration diagrams 1400 (FIG. 14) emphasize the structural organization of objects.

A statechart diagram 1500 is depicted in FIG. 15. The statechart diagram 1500 includes the sequences of states 1502 that an object or interaction goes through during its life in response to stimuli, together with its responses and actions. It uses a graphic notation that shows states of an object, the events that cause a transition from one state to another, and the actions that result from the transition.

Figure 16:
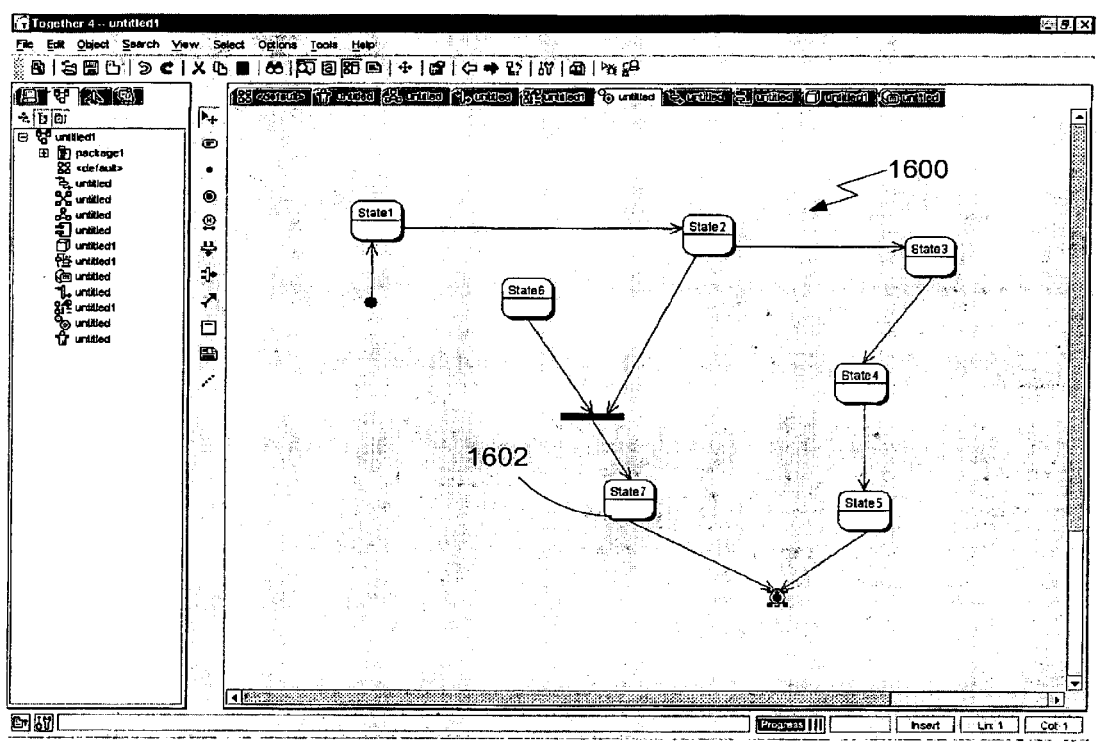
FIG. 16 depicts a user interface displayed by the software development tool depicted in FIG. 2, where the user interface displays an activity diagram of source code.

The functional view can be represented by activity diagrams 1600 and more traditional descriptive narratives such as pseudo code and minispecifications. An activity diagram 1600 is depicted in FIG. 16, and is a special case of a state diagram where most, if not all, of the states are action states 1602 and where most, if not all, of the transitions are triggered by completion of the actions in the source states. Activity diagrams 1600 are used in situations where all or most of the events represent the completion of internally generated actions.

Figure 17:
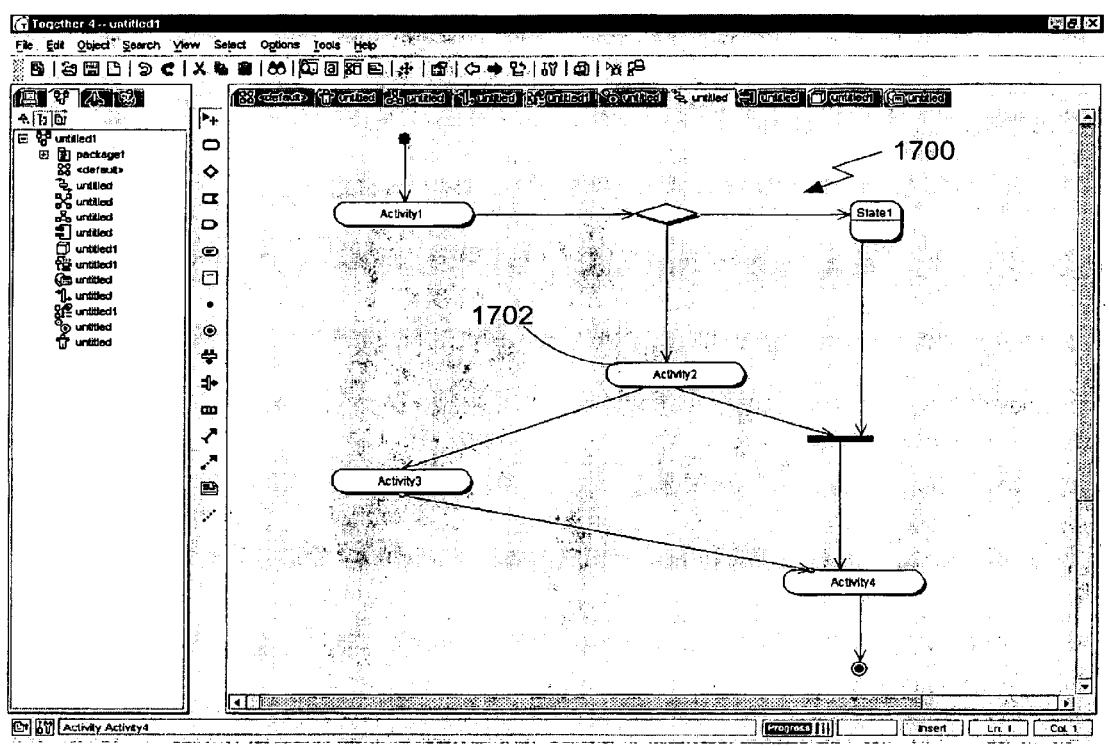
FIG. 17 depicts a user interface displayed by the software development tool depicted in FIG. 2, where the user interface displays a component diagram of source code.
Figure 18:
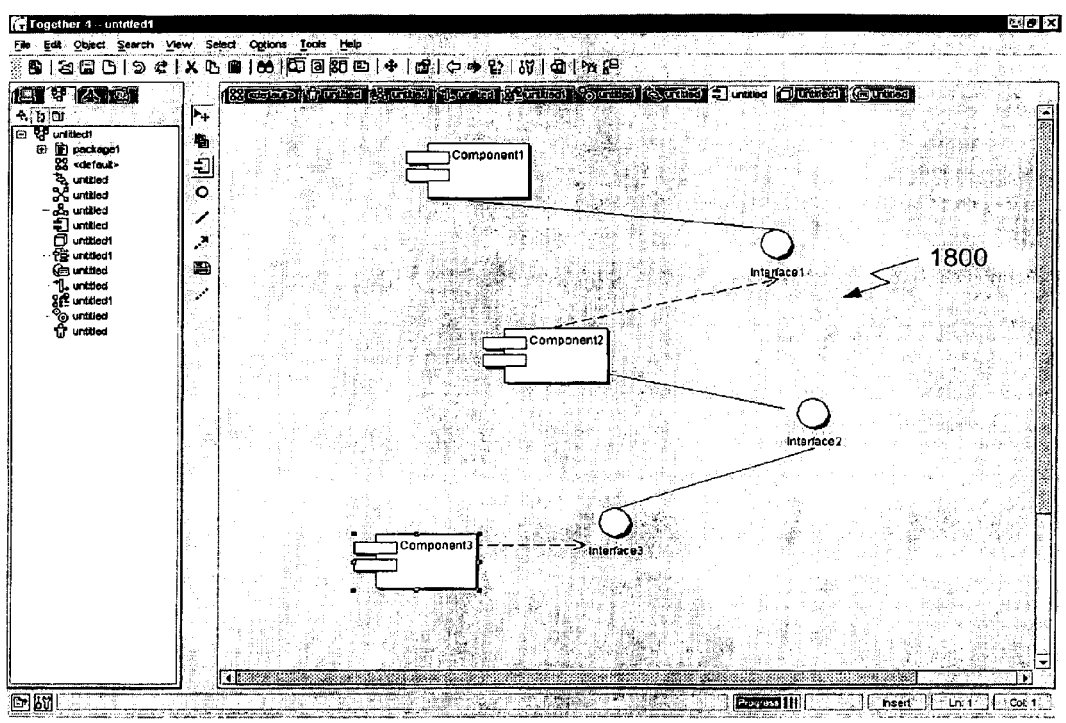
FIG. 18 depicts a user interface displayed by the software development tool depicted in FIG. 2, where the user interface displays a deployment diagram of source code.

There is also a fourth view mingled with the static view called the architectural view. This view is modeled using package, component and deployment diagrams. Package diagrams show packages of classes and the dependencies among them. Component diagrams 1700, depicted in FIG. 17, are graphical representations of a system or its component parts. Component diagrams 1700 show the dependencies among software components, including source code components, binary code components and executable components. As depicted in FIG. 18, Deployment diagrams 1800 are used to show the distribution strategy for a distributed object system. Deployment diagrams 1800 show the configuration of run-time processing elements and the software components, processes and objects that live on them.

Although discussed in terms of class diagrams, one skilled in the art will recognize that the software development tool of the present invention may support these and other graphical views.

QUALITY ASSURANCE MODULE

There are a variety of modules 704 in the software development tool 610 of the present invention. Some of the modules 704 access information to generate graphical and code documentation in custom formats, export to different file formats, or develop patterns. The software development tool also includes a quality assurance (QA) module which monitors the modifications to the source code and calculates various complexity metrics, i.e., various measurements of the program's performance or efficiency, to support quality assurance. The types of metrics calculated by the software development tool include basic metrics, cohesion metrics, complexity metrics, coupling metrics, Halstead metrics, inheritance metrics, maximum metrics, polymorphism metrics, and ratio metrics. Examples of these metrics with their respective definitions are identified in Tables 1–9 below.

TABLE 1

Basic Metrics

| Basic Metrics | Description |
| --- | --- |
| Lines Of Code | Counts the number of code lines. The user determines whether to include comments and blank lines. |
| Number Of Attributes | Counts the number of attributes. The user determines whether to include inherited attributes. Inherited attributes may be counted. If a class has a high number of attributes, it may be appropriate to divide it into subclasses. |
| Number Of Classes | Counts the number of classes. |
| Number of Constructors | Counts the number of constructors. The user determines whether to include all constructors, or to limit the count to public constructors, protected constructors, etc. |
| Number Of Import Statements | Counts the number of imported packages/classes. This measure can highlight excessive importing, and also can be used as a measure of coupling. |
| Number Of Members | Counts the number of members, i.e., attributes and operations. The user determines whether to include inherited members. If a class has a high number of members, it may be appropriate to divide it into subclasses. |
| Number Of Operations | Counts the number of operations. The user determines whether to include inherited operations. If a class has a high number of operations, it may be appropriate to divide it into subclasses. |

TABLE 2

Cohesion Metrics

| Cohesion Metrics | Description |
| --- | --- |
| Lack Of Cohesion Of Methods 1 | Takes each pair of methods in a class and determines a set of fields accessed by each of them. If the pair has disjoint sets of field accesses, the value for P is incremented by one. If the pair shares at least one field access, then the value for Q is incremented by one. After considering each pair of methods: RESULT = (P > Q) ? (P − Q): 0 A low value indicates high coupling between methods, which indicates potentially low reusability and increased testing because many methods can affect the same attributes. |
| Lack Of Cohesion Of Methods 2 | Counts the percentage of methods that do not access a specific attribute averaged over all attributes in the class. A high value of cohesion (a low lack of cohesion) implies that the class is well designed. A cohesive class will tend to provide a high degree of encapsulation, whereas a lack of cohesion decreases encapsulation and increases complexity. |
| Lack Of Cohesion Of Methods 3 | Measures the dissimilarity of methods in a class by attributes. If m = number of methods in a class a = number of attributes in a class mA = number of methods that access an attribute EmA = sum of mA for each attribute Then RESULT = 100 * (EmA/a − m) / (1 − m) A low value indicates good class subdivision, which implies simplicity and high reusability. A high lack of cohesion increases complexity, thereby increasing the likelihood of errors during the development process. |

TABLE 3

Complexity Metrics

| Complexity Metrics | Description |
|---|---|
| Attribute Complexity | Defined as the sum of each attribute's value in the class. The value is evaluated as: boolean 1, Void 3, Long 3; byte 1, Boolean 3, Number 3; char 1, Byte 3, Float 3; short 1, Character 3, Double 3; int 1, String 3, array 3; long 1, StringBuffer 3, java.lang.* 5; float 2, Short 3, Vector 7; double 2, Integer 3, others 9 |
| Cyclomatic Complexity | Represents the cognitive complexity of the class. It counts the number of possible paths through an algorithm by counting the number of distinct regions on a flowgraph, i.e., the number of 'if,' 'for' and 'while' statements in the operation's body. The user determines whether to include case labels of switch statement. |
| Number Of Remote Methods | Processes all of the methods and constructors, and counts the number of different remote methods called. A remote method is defined as a method which is not declared in either the class itself or its ancestors. |
| Response For Class | Calculated as 'Number of Local Methods' + 'Number of Remote Methods.' The size of the response set for the class includes methods in the class' inheritance hierarchy and methods that can be invoked on other objects. A class which provides a larger response set is considered to be more complex and requires more testing than one with a smaller overall design complexity. |
| Weighted Methods Per Class 1 | The sum of the complexity of all methods for a class, where each method is weighted by its cyclomatic complexity. The number of methods and the complexity of the methods involved is a predictor of how much time and effort is required to develop and maintain the class. Methods specified in a class are included, i.e., methods inherited from a parent are excluded. |
| Weighted Methods Per Class 2 | Measures the complexity of a class, assuming that a class with more methods than another is more complex, and that a method with more parameters than another is also likely to be more complex. Methods specified in a class are included, i.e., methods inherited from a parent are excluded. |

TABLE 4

Coupling Metrics

| Coupling Metrics | Description |
|---|---|
| Coupling Between Objects | Represents the number of other classes to which a class is coupled. Counts the number of reference types that are used in attribute declarations, formal parameters, return types, throws declarations and local variables, and types from which attribute and method selections are made. Primitive types, types from java.lang package, and supertypes are not counted. Excessive coupling between objects is detrimental to modular design and prevents reuse. The more independent a class is, the easier it is to reuse it in another application. In order to improve modularity and promote encapsulation, inter-object class couples should be kept to a minimum. The larger the number of couples, the higher the sensitivity to changes in other parts of the design, and therefore maintenance is more difficult. A measure of coupling is useful to determine how complex the testing of various parts of a design is likely to be. The higher the inter-object class coupling, the more rigorous the testing needs to be. |
| Coupling Factor | The fraction having the number of non-inheritance couplings as a numerator and the maximum possible number of couplings in a system as a denominator. This measure is from the Metrics for Object-Oriented Development suite. |
| Data Abstraction Coupling | Counts the number of reference types used in the attribute declarations. Primitive types, types from java.lang package and super types are not counted. |
| FanOut | Counts the number of reference types that are used in attribute declarations, formal parameters, return types, throws declarations, and local variables. Simple types and super types are not counted. |

TABLE 5

Halstead Metrics

| Halstead Metrics | Description |
|---|---|
| Halstead Difficulty | This measure is one of the Halstead Software Science metrics. It is calculated as ('Number of Unique Operators' / 'Number of Unique Operands') * ('Number of Operands' / 'Number of Unique Operands'). |
| Halstead Effort | This measure is one of the Halstead Software Science metrics. It is calculated as 'Halstead Difficulty' * 'Halstead Program Volume.' |
| Halstead Program Length | This measure is one of the Halstead Software Science metrics. It is calculated as 'Number of Operators' + 'Number of Operands.' |
| Halstead Program Vocabulary | This measure is one of the Halstead Software Science metrics. It is calculated as 'Number of Unique Operators' + 'Number of Unique Operands.' |
| Halstead Program Volume | This measure is one of the Halstead Software Science metrics. It is calculated as 'Halstead Program Length' * Log2('Halstead Program Vocabulary'). |
| Number Of Operands | This measure is used as an input to the Halstead Software Science metrics. It counts the number of operands used in a class |
| Number Of Operators | This measure is used as an input to the Halstead Software Science metrics. It counts the number of operators used in a class |
| Number Of Unique Operands | This measure is used as an input to the Halstead Software Science metrics. It counts the number of unique operands used in a class. |
| Number Of Unique Operators | This measure is used as an input to the Halstead Software Science metrics. It counts the number of unique operators used in a class. |

TABLE 6

Incapsulation Metrics

| Incapsulation Metrics | Description |
|---|---|
| Attribute Hiding Factor | The fraction having the sum of the invisibilities of all attributes defined in all classes as a numerator, and the total number of attributes defined in the project as a denominator. The invisibility of an attribute is the percentage of the total classes from which this attribute is not visible. This measure is from the Metrics for Object-Oriented Development suite. |

TABLE 6-continued

Incapsulation Metrics

| Incapsulation Metrics | Description |
|---|---|
| Method Hiding Factor | The fraction having the sum of the invisibilities of all methods defined in all classes as a numerator, and the total number of methods defined in the project as a denominator. The invisibility of a method is the percentage of the total classes from which this method is not visible. This measure is from the Metrics for Object-Oriented Development suite. |

TABLE 7

Inheritance Metrics

| Inheritance Metrics | Description |
|---|---|
| Attribute Inheritance Factor | The fraction having the sum of inherited attributes in all classes in the project as a numerator, and the total number of available attributes (locally defined plus inherited) for all classes as a denominator. This measure is from the Metrics for Object-Oriented Development suite. |
| Depth Of Inheritance Hierarchy | Counts how far down the inheritance hierarchy a class or interface is declared. High values imply that a class is quite specialized. |
| Method Inheritance Factor | The fraction having the sum of inherited methods in all classes in the project as a numerator, and the total number of available methods (locally defined plus inherited) for all classes as a denominator. This measure is from the Metrics for Object-Oriented Development suite. |
| Number Of Child Classes | Counts the number of classes which inherit from a particular class, i.e., the number of classes in the inheritance tree down from a class. A non-zero value indicates that the particular class is being re-used. The abstraction of the class may be poor if there are too many child classes. A high value of this measure points to the definite amount of testing required for each child class. |

TABLE 8

Maximum Metrics

| Maximum Metrics | Description |
|---|---|
| Maximum Number Of Levels | Counts the maximum depth of 'if,' 'for' and 'while' branches in the bodies of methods. Logical units with a large number of nested levels may need implementation simplification and process improvement because groups that contain more than seven pieces of information are increasingly harder for people to understand in problem solving. |
| Maximum Number Of Parameters | Displays the maximum number of parameters among all class operations. Methods with many parameters tend to be more specialized and, thus, are less likely to be reusable. |
| Maximum Size Of Operation | Counts the maximum size of the operations for a class. Method size is determined in terms of cyclomatic complexity, i.e., the number of 'if,' 'for' and 'while' statements in the body of the operation. The user determines whether to include case labels of switch statement. |

TABLE 9

Polymorphism Metrics

| Polymorphism Metrics | Description |
|---|---|
| Number Of Added Methods | Counts the number of operations added by a class. Inherited and overridden operations are not counted. Classes without parents are not processed. A large value of this measure indicates that the functionality of the given class becomes increasingly distinct from that of the parent classes. In this case, it should be considered whether this class genuinely should be inheriting from the parent, or if it could be broken down into several smaller classes. |
| Number Of Overridden Methods | Counts the number of inherited operations which a class overrides. Classes without parents are not processed. High values tend to indicate design problems, i.e., subclasses should generally add to and extend the functionality of the parent classes rather than overriding them. |
| Polymorphism Factor | This measure is from the Metrics for Object-Oriented Development suite, and is calculated as a fraction. The numerator is the sum of the overriding methods in all classes. This is the actual number of possible different polymorphic situations. A given message sent to a class can be bound, statically or dynamically, to a named method implementation. The latter can have as many shapes (morphos) as the number of times this same method is overridden in that class' descendants. The denominator represents the maximum number of possible distinct polymorphic situations for that class as the sum for each class of the number of new methods multiplied by the number of descendants. This maximum would be the case where all new methods defined in each class would be overridden in all of their derived classes.. |

TABLE 10

Ratio Metrics

| Ratio Metrics | Description |
|---|---|
| Comment Ratio | Counts the ratio of comments to total lines of code including comments. The user determines whether to include blank lines as part of the total lines of code. |
| Percentage Of Package Members | Counts the percentage of package members in a class. |
| Percentage Of Private Members | Counts the percentage of private members in a class. |
| Percentage Of Protected Members | Counts the percentage of protected members in a class. |
| Percentage Of Public Members | Counts the proportion of vulnerable members in a class. A large proportion of such members means that the class has high potential to be affected by external classes and means that increased efforts will be needed to test such a class thoroughly. |
| True Comment Ratio | Counts the ratio of comments to total lines of code excluding comments. The user determines whether to include blank lines as part of the total lines of code. |

The QA module also provides audits, i.e., the module checks for conformance to predefined or user-defined styles. The types of audits provided by the module include coding style, critical errors, declaration style, documentation, naming style, performance, possible errors and superfluous content. Examples of these audits with their respective definitions are identified in Tables 10–17 below.

TABLE 11

Coding Style Audits

| Coding Style Audits | Description |
|---|---|
| Avoid Complex Initialization or Update Clause in For Loops | When using the comma operator in the initialization or update clause of a for statement, avoid the complexity of using more than three variables. |
| Avoid Implementation Packages Referencing | This rule helps you avoid referencing packages that normally should not be referenced. |
| Access Of Static Members Through Objects | Static members should be referenced through class names rather than through objects. |
| Assignment To Formal Parameters | Formal parameters should not be assigned. |
| Avoid Too Long Files | According to Sun Code Conventions for Java, files longer than 2000 lines are cumbersome and should be avoided. |
| Avoid Too Long Lines | According to Sun Code Conventions for Java, lines longer than 80 characters should be avoided, since they're not handled well by many terminals and tools. |
| Complex Assignment | Checks for the occurrence of multiple assignments and assignments to variables within the same expression. Complex assignments should be avoided since they decrease program readability. |
| Don't Code Numerical Constants Directly | According to Sun Code Conventions for Java, numerical constants (literals) should not be coded directly, except for -1, 0, and 1, which can appear in a for loop as counter values. |
| Don't Place Multiple Statements on the Same Line | According to Sun Code Conventions for Java, each line should contain at most one statement. |
| Don't Use the Negation Operator Frequently | The negation operator slows down the readability of the program. Thus, it is recommended that it not be used frequently. |
| Operator '?:' May Not Be Used | The operator '?:' makes the code harder to read than the alternative form with an if-statement. |
| Parenthesize Conditional Part of Ternary Conditional Expression | According to Sun Code Conventions for Java, if an expression containing a binary operator appears before the ? in the ternary ? : operator, it should be parenthesized. |
| Put Declarations Only at the Beginning of Blocks | Sun Code Conventions for Java recommends to put declarations only at the beginning of blocks. (A block is any code surrounded by curly braces "{" and "}".) Don't wait to declare variables until their first use; it can confuse the unwary programmer and hamper code portability within the scope. |
| Provide Incremental In For-Statement or use while-statement | Checks if the third argument of the 'for'-statement is missing. |
| Replacement For Demand Imports | Demand import-declarations must be replaced by a list of single import-declarations that are actually imported into the compilation unit. In other words, import-statements may not end with an asterisk. |
| Switch Statement Should Include a Default Case | According to Sun Code Conventions for Java, every switch statement should include a default case. |
| Use Abbreviated Assignment Operator | Use the abbreviated assignment operator in order to write programs more rapidly. Also some compilers run faster with the abbreviated assignment operator. |
| Use 'this' Explicitly To Access Class Members | Tries to make the developer use 'this' explicitly when trying to access class members. Using the same class member names with parameter names often makes what the developer is referring to unclear. |

TABLE 12

Critical Errors Audits

| Critical Errors Audits | Description |
|---|---|
| Avoid Hiding Inherited Attributes | Detects when attributes declared in child classes hide inherited attributes. |
| Avoid Hiding Inherited Static Methods | Detects when inherited static operations are hidden by child classes. |
| Command Query Separation | Prevents methods that return a value from a modifying state. The methods used to query the state of an object must be different from the methods used to perform commands (change the state of the object). |
| Hiding Of Names | Declarations of names should not hide other declarations of the same name. |
| Inaccessible Constructor Or Method Matches | Overload resolution only considers constructors and methods that are visible at the point of the call. If, however, all the constructors and methods were considered, there may be more matches. This rule is violated in this case. Imagine that ClassB is in a different package than ClassA. Then the allocation of ClassB violates this rule since the second constructor is not visible at the point of the allocation, but it still matches the allocation (based on signature). Also the call to open in ClassB violates this rule since the second and the third declarations of open are not visible at the point of the call, but it still matches the call (based on signature). |
| Multiple Visible Declarations With Same Name | Multiple declarations with the same name must not be simultaneously visible except for overloaded methods. |
| Overriding a Non-Abstract Method With an Abstract Method | Checks for abstract methods overriding non-abstract methods in a subclass. |
| Overriding a Private Method | A subclass should not contain a method with the same name and signature as in a superclass if these methods are declared to be private. |
| Overloading Within a Subclass | A superclass method may not be overloaded within a subclass unless all overloading in the superclass are also overridden in the subclass. It is very unusual for a subclass to be overloading methods in its superclass without also overriding the methods it is overloading. More frequently this happens due to inconsistent changes between the superclass and subclass - i.e., the intention of the user is to override the method in the superclass, but due to the error, the subclass method ends up overloading the superclass method. |
| Use of Static Attribute for Initialization | Non-final static attributes should not be used in initializations of attributes. |

TABLE 13

Declaration Style Audits

| Declaration Style Audits | Description |
|---|---|
| Badly Located Array Declarators | Array declarators must be placed next to the type descriptor of their component type. |
| Constant Private Attributes Must Be Final | Private attributes that never get their values changed must be declared final. By explicitly declaring them in such a way, a reader of the source code get some information of how the attribute is supposed to be used. |
| Constant Variables Must Be Final | Local variables that never get their values changed must be declared final. By explicitly declaring them in such a way, a reader of the source code obtains information about how the variable is supposed to be used. |

TABLE 13-continued

Declaration Style Audits

| Declaration Style Audits | Description |
|---|---|
| Declare Variables In One Statement Each | Several variables (attributes and local variables) should not be declared in the same statement. |
| Instantiated Classes Should Be Final | This rule recommends making all instantiated classes final. It checks classes which are present in the object model. Classes from search/classpath are ignored. |
| List All Public And Package Members First | Enforces a standard to improve readability. Methods/data in your class should be ordered properly. |
| Order of Class Members Declaration | According to Sun Code Conventions for Java, the parts of a class or interface declaration should appear in the following order<br>1. Class (static) variables. First the public class variables, then the protected, then package level (no access modifier), and then the private.<br>2. Instance variables. First the public class variables, then the protected, then package level (no access modifier), and then the private.<br>3. Constructors<br>4. Methods |
| Order Of Appearance Of Modifiers | Checks for correct ordering of modifiers. For classes, this includes visibility (public, protected or private), abstract, static, final. For attributes, this includes visibility (public, protected or private), static, final, transient, volatile. For operations, this includes visibility (public, protected or private), abstract, static, final, synchronized, native. |
| Put the Main Function Last | Tries to make the program comply with various coding standards regarding the form of the class definitions. |
| Place Public Class First | According to Sun Code Conventions for Java, the public class or interface should be the first class or interface in the file. |

TABLE 14

Documentation Audits

| Documentation Audits | Description |
|---|---|
| Bad Tag In JavaDoc Comments | This rule verifies code against accidental use of improper JavaDoc tags. |
| Distinguish Between JavaDoc And Ordinary Comments | Checks whether the JavaDoc comments in your program ends with '**/' and ordinary C-style ones with '*/.' |
| Provide File Comments | According to Sun Code Conventions for Java, all source files should begin with a c-style comment that lists the class name, version information, date, and copyright notice. |
| Provide JavaDoc Comments | Checks whether JavaDoc comments are provided for classes, interfaces, methods and attributes. Options allow to specify whether to check JavaDoc comments for public, package, protected or all classes and members. |

TABLE 15

Naming Style Audits

| Naming Style Audits | Description |
|---|---|
| Class Name Must Match Its File Name | Checks whether top level classes or interfaces have the same name as the file in which they reside. |
| Group Operations With Same Name Together | Enforces standard to improve readability. |
| Naming Conventions | Takes a regular expression and item name and reports all occurrences where the pattern does not match the declaration. |
| Names Of Exception Classes | Names of classes which inherit from Exception should end with Exception. |
| Use Conventional Variable Names | One-character local variable or parameter names should be avoided, except for temporary and looping variables, or where a variable holds an undistinguished value of a type. |

TABLE 16

Performance Audits

| Performance Audits | Description |
|---|---|
| Avoid Declaring Variables Inside Loops | This rule recommends declaring local variables outside the loops since declaring variables inside the loop is less efficient. |
| Append To String Within a Loop | Performance enhancements can be obtained by replacing String operations with StringBuffer operations if a String object is appended within a loop. |
| Complex Loop Expressions | Avoid using complex expressions as repeat conditions within loops. |

TABLE 17

Possible Error Audits

| Possible Error Audits | Description |
|---|---|
| Avoid Empty Catch Blocks | Catch blocks should not be empty. Programmers frequently forget to process negative outcomes of a program and tend to focus more on the positive outcomes. When 'Check parameter usage' option is on, this rule also checks, whether code does something with the exception parameter or not. If not, violation is raised. You can also specify the list of exceptions, which should be ignored. For example, for PropertyVetoException catch block usually is empty - as a rule, the program just does nothing if this exception occurs. |
| Avoid Public And Package Attributes | Declare the attributes either private or protected, and provide operations to access or change them. |
| Avoid Statements With Empty Body | If a statement with an empty body exists in the code, the software development tool will display this error message when an audit is performed |
| Assignment To For-Loop Variables | 'For'-loop variables should not be assigned. |
| Don't Compare Floating Point Types | Avoid testing for equality of floating point numbers since floating-point numbers that should be equal are not always equal due to rounding problems. |
| Enclosing Body Within a Block | The statement of a loop must always be a block. The 'then' and 'else' parts of 'if'-statements must always be blocks. This makes it easier to add statements without accidentally introducing bugs in case the developer forgets to add braces. |
| Explicitly Initialize All Variables | Explicitly initialize all variables. The only reason not to initialize a variable is where it's declared is if the initial value depends on some computation occurnng first. |

TABLE 17-continued

Possible Error Audits

| Possible Error Audits | Description |
| --- | --- |
| Method finalize( ) Doesn't Call super.finalize( ) | Calling of super.finalize( ) from finalize( ) is good practice of programming, even if the base class doesn't define the finalize( ) method. This makes class implementations less dependent on each other. |
| Mixing Logical Operators Without Parentheses | An expression containing multiple logical operators should be parenthesized properly. |
| No Assignments In Conditional Expressions | Use of assignment within conditions makes the source code hard to understand. |
| Supply Break or Comment in Case Statement | According to Sun Code Conventions for Java, every time a case falls through (doesn't include a break statement), a comment should be added where the break statement would normally be. The break in the default case is redundant, but it prevents a fall-through error if later another case is added. |
| Use 'equals' Instead Of '==' | The '==' operator used on strings checks if two string objects are two identical objects. In most situations, however, one likes to simply check if two strings have the same value. In these cases, the 'equals' method should be used. |
| Use 'L' Instead Of '1' at the end of integer constant | It is better to use uppercase 'L' to distinguish the letter 'l' from the number '1.' Thus, if a lowercase "1" is used, the software development tool will display this error message when an audit is performed. |
| Use Of the 'synchronized' Modifier | The 'synchronized' modifier on methods can sometimes cause confusion during maintenance as well as during debugging. This rule therefore recommends against using this modifier, and instead recommends using 'synchronized' statements as replacements. |

TABLE 18

Superfluous Content Audits

| Superfluous Content Audits | Description |
| --- | --- |
| Duplicate Import Declarations | There should be at most one import declaration that imports a particular class/package |
| Don't Import the Package the Source File Belongs To | No classes or interfaces need to be imported from the package to which the source code file belongs. Everything in that package is available without explicit import statements. |
| Explicit Import Of the java.lang Classes | If the code calls for explicit import of classes from the package 'java.lang,' the software development tool will display this error message when an audit is performed. |
| Equality Operations On Boolean Arguments | Avoid performing equality operations on Boolean operands. 'True' and 'false' literals should not be used in conditional clauses. |
| Imported Items Must Be Used | It is not legal to import a class or an interface and never use it. This rule checks classes and interfaces that are explicitly imported with their names - that is not with import of a complete package, using an asterisk. If unused class and interface imports are omitted, the amount of meaningless source code is reduced - thus the amount of code to be understood by a reader is minimized. |
| Unnecessary Casts | Checks for the use of type casts that are not necessary. |

TABLE 18-continued

Superfluous Content Audits

| Superfluous Content Audits | Description |
| --- | --- |
| Unnecessary 'instanceof' Evaluations | Verifies that the runtime type of the left-hand side expression is the same as the one specified on the right-hand side. |
| Unused Local Variables And Formal Parameters | Local variables and formal parameter declarations must be used. |
| Use Of Obsolete Interface Modifier | The modifier 'abstract' is considered obsolete and should not be used. |
| Use Of Unnecessary Interface Member Modifiers | All interface operations are implicitly public and abstract. All interface attributes are implicitly public, final and static. |
| Unused Private Class Member | An unused class member might indicate a logical flaw in the program. The class declaration has to be reconsidered in order to determine the need of the unused member(s). |
| Unnecessary Return Statement Parentheses | According to Sun Code Conventions for Java, a return statement with a value should not use parentheses unless they make the return value more obvious in some way. |

Figure 19A:
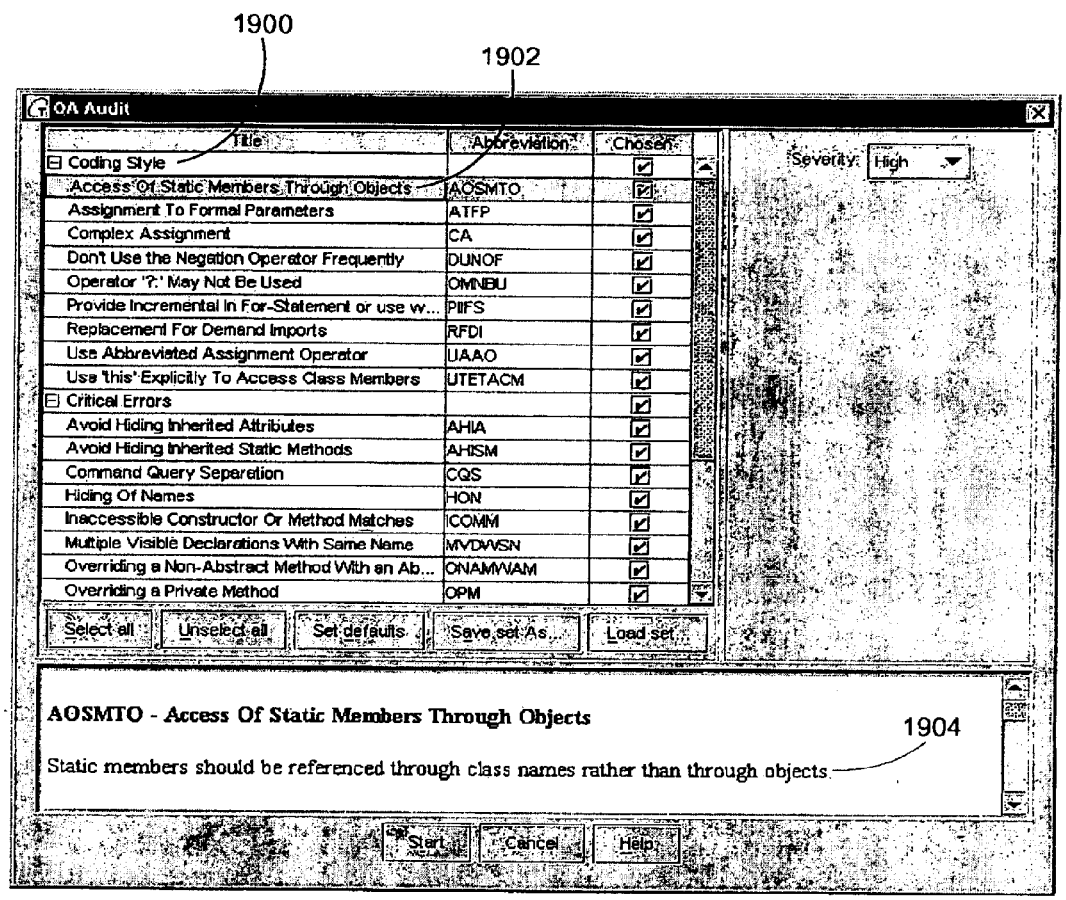
FIG. 19A depicts a user interface displayed by the software development tool depicted in FIG. 2, where the user interface displays a list of predefined criteria which the software development tool checks in the source code.
Figure 19B:
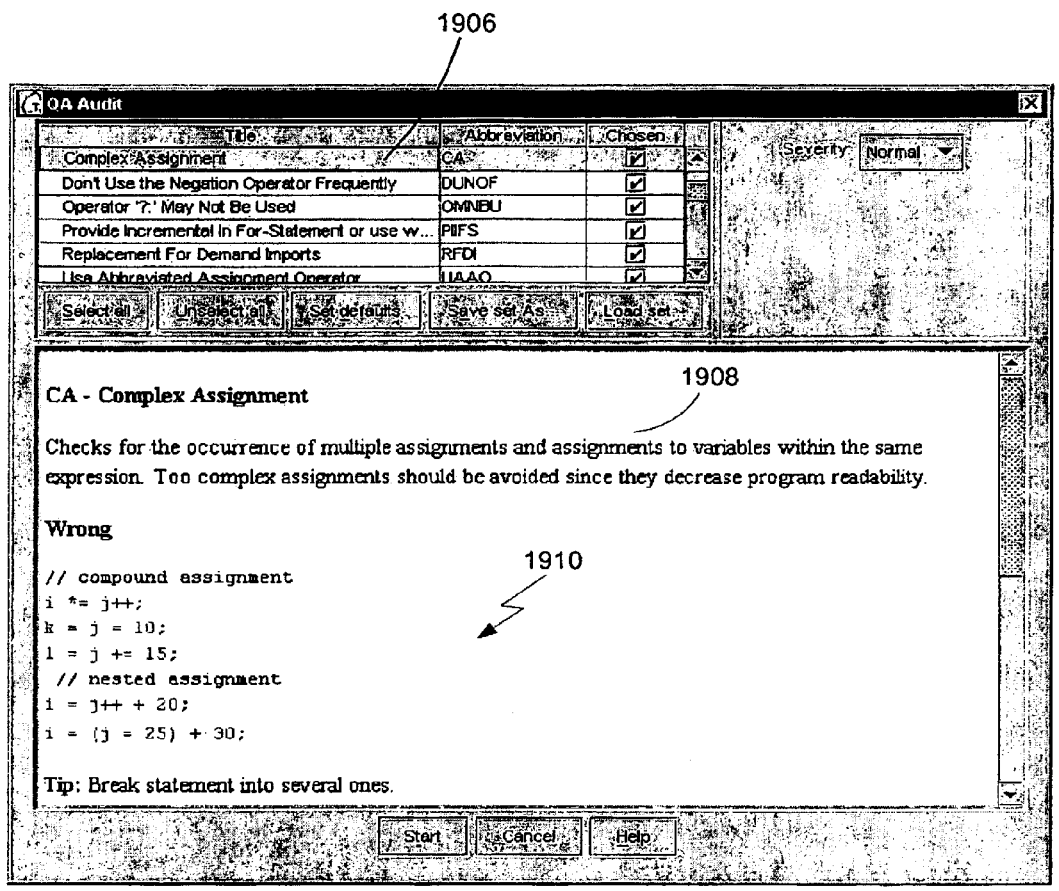
FIG. 19B depicts a user interface displayed by the software development tool depicted in FIG. 2, where the user interface displays the definition of the criteria which the software development tool checks in the source code, and an example of source code which does not conform to the criteria.
Figure 19C:
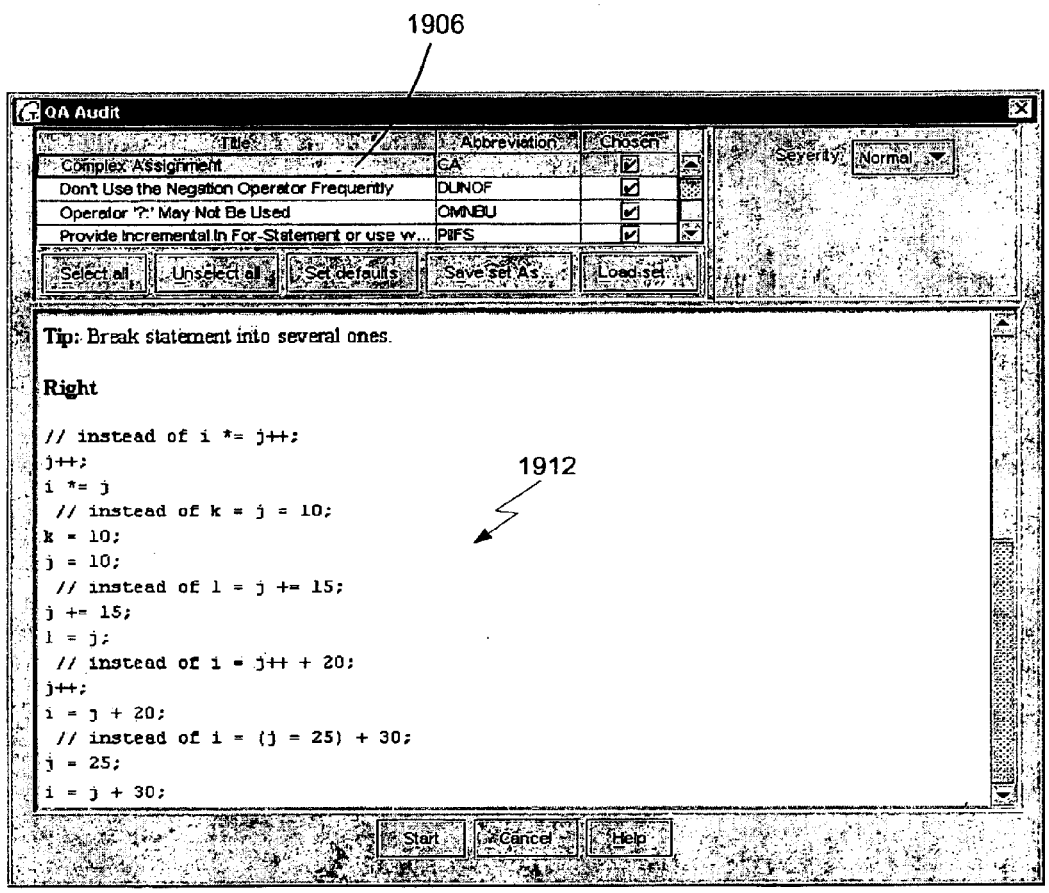
FIG. 19C depicts a user interface displayed by the software development tool depicted in FIG. 2, where the user interface displays an example of source code which conforms to the criteria which the software development tool checks in the source code.

If the QA module determines that the source code does not conform to the audit and/or the metrics requirements, an error message is provided to the developer. The audit and metrics requirements are well known in software development. For example, as depicted in FIG. 19A, the software development tool checks for a variety of coding styles 1900. If the software development tool were to check for "Access Of Static Members Through Objects" 1902, it would verify whether static members are referenced through class names rather than through objects 1904. Further, as depicted in FIG. 19B, if the software development tool were to check for "Complex Assignment" 1906, the software development tool would check for the occurrence of multiple assignments and assignments to variables within the same expression to avoid complex assignments since these decrease program readability 1908. An example of source code 1910 having a complex assignment is depicted in FIG. 19B, and the corresponding source code 1912 having a non-complex assignment is depicted in FIG. 19C. For example, the complex assignment:

$$i*=j++$$

in the source code 1910 in FIG. 19B can be represented in a non-complex form as follows:

$$j++$$

$$i*=j$$

Both the complex and the non-complex formulas perform the same operations, i.e., add 1 to j and multiply j with i. If the complex assignment identified in the source code 1910 in FIG. 19B is used, the software development tool will generate the "Complex Assignment" error message when an audit is performed. If, on the other hand, the non-complex assignment identified in the source code 1912 in FIG. 19C is used, the software development tool will not generate the "Complex Assignment" error message when an audit is performed.

An example for each of the audits identified above in Tables 11–18 is provided below:

CODING STYLE

Avoid Complex Initialization or Update Clause in for Loops

When using the comma operator in the initialization or update clause of a for statement, the developer should avoid the complexity of using more than three variables. The following source code illustrates the use of more than three variables in a "for statement":

```
for (i = 0, j =0, k =10, 1=-1; i <cnt;
    i++, j++, k--, 1 += 2 ) {
    // do something
}
```

To remedy the complexity of using more than three variables, the source code may be rewritten as follows:

```
1=-1;
for ( i = 0, j=0, k=10; i < cnt;
    i++,j++,k-- ) {
    // do something
    1 += 2;
}
```

Avoid Implementation Packages Referencing

This rule helps a developer avoid referencing packages that normally should not be referenced. For example, if the developer uses Facade or AbstractFactory patterns, he or she can make sure that no one uses direct calls to the underlying constructors of the classes.

The developer can divide his or her packages into interface and implementation packages, and ensure that no one ever refers to the implementation packages, while the interface packages are accessible for reference. The developer can set up two lists of packages: the allowed (interface) and banned (implementation) packages. For each class reference in source code, this rule verifies that the package where this class belongs is in the allowed list and not in the banned list.

Package names in the list may be:

| | |
|---|---|
| '*' | any package is allowed or banned |
| package name | this package is allowed or banned |
| package name postfixed by '*' | any subpackage of the given package is allowed or banned |

In case of conflict, the narrower rule prevails. For example, if the following list is specifically allowed:

* com.mycompany.openapi.* and the following is banned:

com.mycompany.*

In the above example, all subpackages of com.mycompany package are banned except for those belonging to:

com.mycompany.openapi subpackage.

Access of Static Members Through Objects

Static members should be referenced through class names rather than through objects. For example, the following code is incorrect:

```
class AOSMTO1 {
    void func () {
        AOSMTO1 obj1 = new AOSMTO1();
        AOSMTO2 obj2 = new AOSMTO2();
        obj1.attr = 10;
        obj2.attr = 20;
        obj1.oper();
        obj2.oper();
        this.attr++;
        this.oper();
    }
    static int attr;
    static void oper () {}
}
class AOSMTO2 {
    static int attr;
    static void oper () {}
}
```

The following source code corrects the above code so that the static members are referenced via class names:

```
class AOSMTO1 {
    void func () {
        AOSMTO1 obj1 = new AOSMTO1();
        AOSMTO2 obj2 = new AOSMTO2();
        AOSMTO1.attr = 10;
        AOSMTO2.attr = 20;
        AOSMTO1.oper();
        AOSMTO2.oper();
        AOSMTO1.attr++;
        AOSMTO1.oper();
    }
    static int attr;
    static void oper () {}
}
class AOSMTO2 {
    static int attr;
    static void oper () {}
}
```

Assignment to Formal Parameters

Formal parameters should not be assigned values. For example, the following code increments param by 11, and returns the new value for param:

```
int oper (int param) {
    param += 10;
    return ++param;
}
```

Rather than reassigning the value for param, the following code declares a new variable result, sets result to equal param+11, and returns the value for result:

```
int oper (int param) {
    int result = param + 10;
    return ++result;
}
```

Avoid Too Long Files

Files longer than 2000 lines are cumbersome and should be avoided.

Avoid Too Long Lines

Lines longer than 80 characters should be avoided, since they are not handled well by many terminals and tools.

Complex Assignment

This audit checks for the occurrence of multiple assignments and assignments to variables within the same expression. Complex assignments should be avoided since they decrease program readability.

If the 'strict' option is off, assignments of equal value to several variables in one operation are permitted. For example the following statement would raise violation if 'strict' option were on; otherwise there would be no violation:

i=j=k=0;

The following source code is an example of a compound assignment, which should be avoided:

i*=j++;

k=j=10;

l=j+=15;

The following source code is an example of a nested assignment, which should be avoided:

i=j+++20;

i=(j=25)+30;

The source code shown above is corrected by breaking the statements into several statements. For example, the following source code:

i*=j++;

may be replaced by:

j++;

i*=j

The following code:

k=j=10;

may be replaced by:

k=10;

j=10;

The following code:

l=j+=15;

may be replaced by:

j+=15;

l=j;

The following code:

i=j+++20;

may be replaced by:

j++;

i=j+20;

The following source code:

i=(j=25)+30;

may be replaced by:

j=25;

i=j+30;

Don't Code Numerical Constants Directly

Numerical constants (literals) should not be coded directly, except for −1, 0, and 1, which can appear in a for loop as counter values. Rather than coding numerical constants directly, add static final attributes for numeric constants.

Don't Place Multiple Statements on the Same Line

Each line should contain at most one statement. For example, for the following code:

if(someCondition) someMethod( );

i++; j++;

each statement should be placed on a separate line, as follows:

if(someCondition)
 someMethod( );

i++;

j++;

Don't Use the Negation Operator Frequently

The negation operator slows down the readability of the program, so it is recommended that it should not be used frequently. The following source code illustrates a violation of this rule:

```
boolean isOk = verifySomewhat()
if( !isOk )
    return 0;
else
    return 1;
```

The program logic should be changed to avoid negation:

```
boolean isOk = verifySomewhat()
if( isOk )
    return 1;
else
    return 0;
```

Operator '?:' may not be Used

The operator '?:' makes the code harder to read, than the alternative form with an if-statement. Thus, in the following source code:

```
void func (int a) {
    int b = (a == 10) ? 20 : 30;
}
```

The '?:' operator should be replaced with the appropriate if-else statement.

```
void func (int a) {
    if (a == 10)
```

```
            b = 20;
        else
            b = 30;
}
```

Parenthesize Conditional Part of Ternary Conditional Expression

If an expression containing a binary operator appears before the "?" in the ternary "?:" operator, it should be parenthesized. Thus, the following code:

```
return x>=0 ?x:-x;
``` should be replaced by:

```
return (x>=0) ?x:-x;
```

Put Declarations Only at the Beginning of Blocks

Declarations should be placed only at the beginning of blocks. A block is any code surrounded by curly braces "{" and "}". Waiting to declare variables until their first use can confuse the unwary programmer and hamper code portability within the scope.

Thus, in the following source code:

```
void myMethod() {
    if(condition) {
        doSomeWork();
        int int2 = 0;
        useInt2(int2);
    }
    int int1 = 0;
    useInt1(int1);
}
``` the declarations should be moved to the beginning of the block, as follows:

```
void myMethod() {
    int int1 = 0;// beginning of method block
    if (condition) {
        int int2 = 0;// beginning of "if" block
        doSomeWork();
        useInt2(int2);
    }
    useInt1(int1);
}
```

Provide Incremental in For-statement or Use While-statement

This audit checks if the third argument of the for-statement is missing, as shown below:

```
for ( Enumeration enum = getEnum(); enum.hasMoreElements(); ) {
    Object o = enum.nextElement();
    doSomeProc(o);
}
```

Either the incremental part of a for-structure must be provided or the for-statement must be cast into a while-statement, as shown below:

```
Enumeration enum = getEnum();
while (enum.hasMoreElements()) {
    Object o = enum.nextElement();
    doSomeProc(o);
}
```

Replacement for Demand Imports

Demand import-declarations must be replaced with a list of single import-declarations that are actually imported into the compilation unit. In other words, import-statements may not end with an asterisk. For example, the following source code violates this audit:

```
import java.awt.*;
import javax.swing.*;
class RFDI {
    public static JFrame getFrame (Component com) {
        while (com != null) {
            if (com instanceofJFrame)
                return (JFrame)com;
            com = com.getParent();
        }
        return null;
    }
}
```

To remedy the above, the demand imports should be replaced with a list of single import declarations, as shown below:

```
import java.awt.Component;
import javax.swing.JFrame;
class RFDI {
    public static JFrame getFrame (Component com) {
        while (com != null) {
            if (com instanceofJFrame)
                return (JFrame)com;
            com = com.getParent();
        }
        return null;
    }
}
```

Switch Statement Should Include a Default Case

Every switch statement should include a default case.

Use Abbreviated Assignment Operator

The abbreviated assignment operator should be used to write programs more rapidly. This also increases the speed of some compilers. Thus, the following source code:

```
void oper () {
    int i = 0;
    i = i + 20;
    i = 30* i;
}
``` should be replaced by:

```
void oper () {
    int i = 0;
    i += 20;
    i *= 30;
}
```

Use 'this' Explicitly To Access Class Members

'This' should be used explicitly to access class members because using the same class members' and parameters' names makes references confusing. For example, the following source code:

```
class UTETACM {
    int attr = 10;
    void func () {
        // do something
    }
    void oper () {
        func();
        attr = 20;
    }
}
``` should be replaced by:

```
class UTETACM {
    int attr = 10;
    void func () {
        // do something
    }
    void oper () {
        this.func();
        this.attr = 20;
    }
}
```

CRITICAL ERRORS

Avoid Hiding Inherited Attributes

This audit detects when attributes declared in child classes hide inherited attributes.

Thus, in the following source code:

```
class Elephant extends Animal {
    int attr1;
    // something...;
}
class Animal {
    int attr1;
}
``` the child class attribute should be renamed, as follows:

```
class Elephant extends Animal {
    int elphAttr1;
    // something...;
}
class Animal {
    int attr1;
}
```

Avoid Hiding Inherited Static Methods

This audit detects when inherited static operations are hidden by child classes. Thus, in the following source code:

```
class Elephant extends Animal {
    void oper1() {}
    static void oper2() {}
}
```

```
class Animal {
    static void oper1() {}
    static void oper2() {}
}
``` either ancestor or descendant class operations should be renamed, as follows:

```
class Elephant extends Animal {
    void anOper1 () {}
    static void anOper2 () {}
}
class Animal {
    static void oper1() {}
    static void oper2() {}
}
```

Command Query Separation

This audit prevents methods that return a value from modifying state. The methods used to query the state of an object must be different from the methods used to perform commands (change the state of the object). For example, the following source code violates this audit:

```
class CQS {
    int attr;
    int getAttr () {
        attr += 10;
        return attr;
    }
}
```

Hiding Of Names

Declarations of names should not hide other declarations of the same name. The option 'Formally' regulates whether hiding of names should be detected for parameter variable, if the only usage of it is to assign its value to the attribute with the same name. Thus, for the following source code:

```
class HON {
    int index;
    void func () {
        int index;
        // do something
    }
    void setIndex (int index) {
        this.index = index;
    }
}
```

The variable which hides the attribute or another variable should be renamed, as follows:

```
class HON {
    int index;
    void func () {
        int index1;
        // do something
    }
    void setIndex (int anIndex) {
        this.index = anIndex;
    }
}
```

In the above example, the second violation would be raised only if the "formally" option is switched on.

Inaccessible Constructor or Method Matches

Overload resolution only considers constructors and methods that are visible at the point of the call. If, however, all the constructors and methods were considered, there may be more matches, which would violate this audit.

For example, in the source code below, if ClassB is in a different package than ClassA, then the allocation of ClassB violates this rule since the second constructor is not visible at the point of the allocation, but it still matches the allocation (based on signature). Also the call to oper in ClassB violates this rule since the second and the third declarations of oper is not visible at the point of the call, but it still matches the call (based on signature).

```
public class ClassA {
    public ClassA (int param) {}
    ClassA (char param) {}
    ClassA (short param) {}
    public void oper (int param) {}
    void oper (char param) {}
    void oper (short param) {}
}
```

Either such methods or constructors must be given equal visibility, or their signature must be changed, as follows:

```
public class ClassA {
    ClassA (intparam) {}
    public ClassA (char param) {}
    public ClassA (short param) {}
    public void oper (int param) {}
    void doOper (char param) {}
    void doOper (short param) {}
}
```

Multiple Visible Declarations with Same Name

Multiple declarations with the same name must not be simultaneously visible except for overloaded methods. Thus, in the following source code:

```
class MVDWSN {
    void index () {
        return;
    }
    void func () {
        int index;
    }
}
```

The members (or variables) with clashing names should be renamed, as follows:

```
class MVDWSN {
    void index () {
        return;
    }
    void func () {
        int anIndex;
    }
}
```

Overriding a Non-abstract Method with an Abstract Method

This audit checks for the overriding of non-abstract methods by abstract methods in a subclass. For example, in the following source code, the non-abstract method "func( )" is overridden by the abstract method "func( )" in a subclass:

```
class Animal {
    void func () {}
}
abstract class Elephant extends Animal {
    abstract void func ();
}
```

To remedy this audit, the method may be renamed, or the method should be made abstract in an ancestor class or non-abstract in a descendant, as follows:

```
class Animal {
    void func () {}
}
abstract class Elephant extends Animal {
    abstract void extFunc ();
}
```

Overriding a Private Method

A subclass should not contain a method with the same name and signature as in a superclass if these methods are declared to be private. Thus, in the following source code:

```
class Animal {
    private void func () {}
}
class Elephant extends Animal {
    private void func () {}
}
``` the descendant class' method should be renamed, as follows:

```
class Animal {
    private void func () {}
}
class Elephant extends Animal {
    private void extFunc () {}
}
```

Overloading within a Subclass

A superclass method may not be overloaded within a subclass unless all overloadings in the superclass are also overridden in the subclass. It is very unusual for a subclass to be overloading methods in its superclass without also overriding the methods it is overloading. More frequently this happens due to inconsistent changes between the superclass and subclass—i.e., the intention of the user is to override the method in the superclass, but due to the error, the subclass method ends up overloading the superclass method. The following source code violates this audit:

```
public class Elephant extends Animal {
    public void oper (char c) {}
    public void oper (Object o) {}
}
class Animal {
    public void oper (int i) {}
    public void oper (Object o) {}
}
```

In the above code, the other methods should also be overloaded, as follows:

```
public class Elephant extends Animal {
    public void oper (char c) {}
    public void oper (int i) {}
    public void oper (Object o) {}
}
class Animal {
    public void oper (int i) {}
}
```

Use of Static Attribute for Initialization

Non-final static attributes should not be used in initializations of attributes. Thus, in the following source code:

```
class ClassA {
    static int state = 15;
    static int attr1 = state;
    static int attr2 = ClassA.state;
    static int attr3 = ClassB.state;
}
class ClassB {
    static int state = 25;
}
```

The static attributes used for initialization should be made final, or another constant should be used for initialization, as follows:

```
class ClassA {
    static int state = 15;
    static final int INITIAL_STATE = 15;
    static int attr1 = INITIAL_STATE;
    static int attr2 = ClassA.state;
    static int attr3 = ClassB.state;
}
class ClassB {
    static final int state = 25;
}
```

DECLARATION STYLE

Badly Located Array Declarators

Array declarators must be placed next to the type descriptor of their component type. Thus, the following source code:

```
class BLAD {
    int attr[];
    int oper (int param[]) [] {
        int var[][];
        // do something
    }
}
``` should be replaced by:

```
class BLAD {
    int[] attr;
    int[] oper (int[] param) {
        int[][] var;
        // do something
    }
}
```

Constant Private Attributes must be Final

Private attributes that never get their values changed must be declared final. By explicitly declaring them in such a way, a reader of the source code gets some information regarding how the attribute should be used. Thus, in the following source code:

```
class CPAMBF {
    int attr1 = 10;
    int attr2 = 20;
    void func () {
        attr1 = attr2;
        System.out.println(attr1);
    }
}
``` all private attributes that never change should be made final, as follows:

```
class CPAMBF {
    int attr1 = 10;
    final int attr2 = 20;
    void func () {
        attr1 = attr2;
        System.out.println(attr1);
    }
}
```

Constant Variables Must be Final

Local variables that never get their values changed must be declared final. By explicitly declaring them in such a way, a reader of the source code gets some information regarding how the variable should be used. Thus, in the following source code:

```
void func () {
    int var1 = 10;
    int var2 = 20;
    var1 = var2;
        System.out.println(attr1);
}
``` all variables which are never changed should be made final, as follows:

```
void func () {
    intvar1 = 10;
    final int var2 = 20;
    var1 = var2;
        System.out.println(attr1);
}
```

Declare Variables in One Statement Each

Several variables (attributes and local variables) should not be declared in the same statement. The 'different types only' option can weaken this rule. When such option is chosen, violation is raised only when variables are of different types, for example: "int foo, fooarray[ ];" is definitely wrong. To correct the following source code:

```
class DVIOSE {
    int attr1;
    int attr2, attr3;
    void open () {
        int var1;
        int var2, var3;
    }
}
``` each variable should be declared in separate statements, as follows:

```
class DVIOSE {
    int attr1;
    int attr2;
    int attr3;
    void open () {
        int var1;
        int var2;
        int var3;
    }
}
```

Instantiated Classes Should be Final

This rule recommends making all instantiated classes final. It checks classes which are present in the object model. Classes from search/classpath are ignored. In the following source code:

```
class ICSBF {
    private Class1 attr1 = new Class1();
    // something...
}
class Class1 {
    // something...
}
``` all instantiated classes should be made final, as follows:

```
class ICSBF {
    private Class1 attr1 = new Class1();
    // something...
}
final class Class1 {
    // something...
}
```

List all Public and Package Members First

Enforces standard to improve readability. Methods and/or data in classes should be ordered properly. Thus, in the following source code:

```
class LAPAPMF {
    private int attr;
    public void oper () {}
}
```

Public and package members should be placed before protected and private ones, as follows:

```
class LAPAPMF {
    public void oper () {}
    private int attr;
}
```

Order of Class Members Declaration

The parts of a class or interface declaration should appear in the following order:

1. Class (static) variables. First the public class variables, then the protected, then package level (no access modifier), and then the private.
2. Instance variables. First the public class variables, then the protected, then package level (no access modifier), and then the private.
3. Constructors.
4. Methods.

Order of Appearance of Modifiers

This audit checks for correct ordering of modifiers. For classes, the ordering is: visibility (public, protected or private), abstract, static, final. For attributes, the ordering is: visibility (public, protected or private), static, final, transient, volatile. For operations, the ordering is: visibility (public, protected or private), abstract, static, final, synchronized, native. Thus, the following source code is incorrect:

```
final public class OOAOM {
    public static final int attr1;
    static public int attr2;
}
```

The order of modifiers above should be changed, as follows:

```
public final class OOAOM {
    public static final int attr1;
    public static int attr2;
}
```

Put the Main Function Last

This audit requires that in class definitions, the main function should be placed later in the definition. Thus, the following source code:

```
public class PMFL {
    void func1 () {}
    public static void main (String args[]) {}
    void func2 () {}
}
``` should be modified to:

```
public class PMFL {
    public static void main (String args[]) {}
    void func1 () {}
    void func2 () {}
}
```

Place Public Class First

The public class or interface should be the first class or interface in the file. Thus, the following source code:

```
class Helper {
    // some code
}
public class PPCM {
    // some code
}
``` should be modified to:

```
public class PPCM {
    // some code
}
class Helper {
    // some code
}
```

DOCUMENTATION

Bad Tag in JavaDoc Comments

This audit prevents the accidental use of improper Java-Doc tags. The following example illustrates the use of a bad tag:

```
package audit;
/** Class BTIJDC
 * @BAD_TAG_1
 * @version 1.0 08-Jan-2000
 * @author TogetherSoft
 */
public class BTIJDC {
    /**
     * Attribute attr
     * @BAD_TAG_2
     * @supplierCardinality 0..
     * @clientCardinality 1
     */
    private int attr;
    /** Operation oper
     * @BAD_TAG_3
     * @return int
     */
    public int oper () {}
}
```

The misspelled tags in the above code should be replaced, or any non-standard tags should be added to the list of valid tags.

Distinguish Between JavaDoc And Ordinary Comments

This audit checks whether JavaDoc comments end with '**/' and ordinary C-style documents end with '*/'. Thus, the following code:

```
package audit;
/**
*JavaDoc comment
*/
public class DBJAOC {
    /*
    *C-style comment
    **/
    private int attr;
    /**
```

```
*JavaDoc comment
*/
public void oper () {}
}
``` should be replaced by:

```
package audit;
/**
*JavaDoc comment
**/
public class DBJAOC {
    /*
    *C-style comment
    */
    private int attr;
    /**
    *JavaDoc comment
    **/
    public void oper () {}
}
```

Provide File Comments

All source files should begin with a c-style comment that lists the class name, version information, date, and copyright notice, as follows

```
/*
*Classname
*Version information
*Date
*Copyright notice
*/
```

This audit verifies whether the file begins with a c-style comment.

Provide JavaDoc Comments

This audit checks whether JavaDoc comments are provided for classes, interfaces, methods and attributes.

NAMING STYLE

Class Name must Match its File Name

This audit checks whether the top level class and/or interface has the same name as the file in which it resides. Thus, in the following source code:

// File Audit_CNMMIFN.java
class CNMMIFN { } the class or file should be renamed, as follows:

// File Audit_CNMMIFN.java
class Audit_CNMMIFN { }

Group Operations with same Name Together

This audit requires that group operations with the same name be placed together to improve readability. Thus, the following example:

```
package audit;
class GOWSNT {
    void operation () {}
    void function () {}
    void operation (int param) {}
}
``` should be modified, as follows:

```
package audit;
class GOWSNT {
    void operation 0 {}
    void operation (int param) {}
    void function 0 {}
}
```

Naming Conventions

This audit takes a regular expression and item name and reports all occurrences where the pattern does not match the declaration. Thus, in the following example,

```
package _audit; class _AuditNC {
    void operation1 (int Parameter) {
    void Operation2 (int parameter) {
        int_variable;
    }
    int my_attribute;
    final static int constant;
}
```

The packages, classes, members etc., should be renamed in a proper way, as follows:

```
package audit; class AuditNC {
    void operation1 (int parameter) {
    void operation2 (int parameter) {
        int variable;
    }
    int myAttribute;
    final static int CONSTANT;
}
```

Names of Exception Classes

Names of classes which inherit from Exception should end with Exception.
Thus, the following source code:
  class AuditException extends Exception { }
  class NOEC extends Exception { } should be modified to renmae the exception classes, as follows:
  class AuditException extends Exception { }
  class NOECException extends Exception { }

Use Conventional Variable Names

One-character local variable or parameter names should be avoided, except for temporary and looping variables, or where a variable holds an undistinguished value of a type. Conventional one-character names are:

```
b for a byte
c for a char
d for a double
e for an Exception
f for a float
i, j, k for integers
l for a long
o for an Object
s for a String
```

Local variable or parameter names that consist of only two or three uppercase letters should be avoided to avoid potential conflicts with the initial country codes and domain names that are the first component of unique package names.

The following source code does not give conventional names to all local variables:

```
void func (double d) {
    int i;
        Object o;
        Exception e;
        char s;
        Object f;
        String k;
        Object UK;
}
``` and should be replaced by:

```
void func (double d) {
    int i;
        Object o;
        Exception e;
        char c;
        Object o;
        String s;
        Object o1;
}
```

PERFORMANCE

Avoid Declaring Variables Inside Loops

This rule recommends that local variables be declared outside the loops because declaring variables inside the loop is less efficient. Thus, in the following source code:

```
int good_var = 0
for (int i = 0; i < 100; i++) {
    int var1 = 0;
    // ...
}
while (true) {
    int var2 = 0;
    // ...
}
do {
    int var3 = 0;
    // ...
} while (true);
``` the variable declarations should be moved out of the loop, as follows:

```
int good_var = 0;
int var1;
for (int i = 0; i < 100; i++) {
    var1 = 0;
    // ...
}
int var2;
while (true) {
    var2 = 0;
    // ...
}
int var3;
do {
    var3 = 0;
    // ...
} while (true);
```

Append to String within a Loop

Performance enhancements can be obtained by replacing String operations with StringBuffer operations if a String object is appended within a loop. Thus, in the following example source code:

```
public class ATSWL {
    public String func () {
        String var = "var";
        for (int i = 0; i < 10; i++) {
            var += ("" + i);
        }
        return var;
    }
}
```

StringBuffer class should be used instead of String, as follows:

```
public class ATSWL {
    public String func () {
        StringBuffer var = new StringBuffer("var");
        for (int i = 0; i < 10; i++) {
            var.append("" + i);
        }
        return var.toString();
    }
}
```

Complex Loop Expressions

Avoid using complex expressions as repeat conditions within loops. The following source code violates this audit by using "vector.size( )" within a condition of a "for" loop:

```
void oper () {
    for (int i = 0; i <vector.size(); i++) {
        // do something
    }
    int size = vector.size();
    for (int i = 0; i <size; i++) {
        // do something
    }
}
```

In the above code, the expression "vector.size( )" should be assigned to a variable before the loop, and that variable should be used in the loop, as follows:

```
void oper () {
    int size = vector.size();
    for (int i = 0; i < size; i++) {
        // do something
    }
    int size = vector.size();
    for (int i = 0; i < size; i++) {
        // do something
    }
}
```

POSSIBLE ERRORS

Avoid Empty Catch Blocks

Catch blocks should not be empty. Programmers frequently forget to process negative outcomes of a program and tend to focus more on the positive outcomes.

When the 'Check parameter usage' option is chosen, this rule also checks whether the code does something with the exception parameter or not. If not, a violation is raised.

Avoid Public and Package Attributes

Public and package attributes should be avoided. Rather, the attributes should be declared either private or protected, and operations should be provided to access or change the attribute declarations.

```
class APAPA {
    int attr1;
    public int attr2;
}
```

The visibility of attributes should be changed to either private or protected, and access operations for these attributes should be provided, as follows:

```
class APAPA {
    private int attr1;
    protected int attr2;
    public int getAttn1() {
        return attr1;
    }
    public int getAttr2() {
        return attr2;
    }
    public void setAttr2(int newVal) {
        attr2 = newVal;
    }
}
```

Avoid Statements with Empty Body

Statements having empty bodies should be avoided. For example, in the following source code:

```
StringTokenizer st = new StringTokenizer(class1.getName(), ".", true);
String s;
for( s = ""; st.countTokens() > 2;
    s = s + st.nextToken());
``` a statement body should be provided. In the alternative, the logic of the program may be changed. For example, the "for" statement can be replaced by a "while" statement, as follows:

```
StringTokenizer st = new StringTokenizer(class1.getName(), ".", true);
String s = "";
while( st.countTokens() > 2) {
    s += st.nextToken();
}
```

Assignment to For-Loop Variables

For-loop variables should not be assigned a value. For example, the for-loop variable "i" should not be assigned the value i++ as follows:

```
for (int i = 0; i < charBuf.length; i++) {
    while ( Character.isWhitespace(charBuf[i]))
        i++;
    ....
}
```

A continue operator should be used to correct the above code, as follows:

```
for (int i = 0; i < charBuf.length; i++) {
    while ( Character.isWhitespace(charBuf[i]))
        continue;
    ....
}
```

In the alternative, the for-loop may be converted to a while-loop.

Don't Compare Floating Point Types

Avoid testing floating point numbers for equality. Floating-point numbers that should be equal are not exactly equal due to rounding problems. Thus, the direct comparison in the following code:

```
void oper (double d) {
    if( d!= 15.0 ) {
        for ( double f = 0.0; f < d; f += 1.0) {
            // do something
        }
    }
}
``` should be replaced with an estimation of the absolute value of the difference, as follows:

```
void oper (double d) {
    if( Math.abs(d - 15.0) < Double.MIN_VALUE * 2 ) {
        for (double f = 0.0; d - f > DIFF; f += 1.0) {
            // do something
        }
    }
}
```

Enclosing Body within a Block

The statement of a loop must always be a block. The then and else parts of if—statements must always be blocks. This makes it easier to add statements without accidentally introducing bugs due to missing braces. Thus, the following code is missing braces for both the if-loop and the while-loop:

```
if( st == null)
    return;
while( st.countTokens() > 2)
    s += st.nextToken();
```

The correct form for the above code is as follows:

```
if(st == null) {
    return;
}
while( st.countTokens() > 2) {
    s += st.nextToken();
}
```

Explicitly Initialize all Variables

All variables should explicitly be initialized. The only reason not to initialize a declared variable is if the initial value depends on a previous computation. For example, the following source code violates this rule since var 0 and var 2 are not initialized:

```
void func () {
    int var0;
    int var1 = 1, var2;
    // do something.. }
```

The correct form for the above source code is as follows:

```
void func () {
    int var0 = 0;
    int var1 = 1, var2 = 0;
    // do something..
}
```

Method finalize( ) Doesn't Call super.finalize( )

It is a good practice of programming to call super.finalize( ) from finalize( ), even if the base class doesn't define the finalize( ) method. This makes class implementations less dependent on each other. Thus, the following source code:

```
void finalize () {
}
``` should be modified to:

```
void finalize () {
    super.finalize();
}
```

Mixing Logical Operators without Parentheses

An expression containing multiple logical operators together should be parenthesized properly. Thus, in the following source code:

```
void oper () {
    boolean a, b, c;
    // do something
    if( a || (b && c) {
        // do something
        return;
    }
}
``` the parenthesis should be used to clarify complex logical expression to the reader, as follows:

```
void oper () {
    boolean a, b, c;
    // do something
    if( a || (b && c)) {
        // do something
        return;
    }
}
```

No Assignments in Conditional Expressions

Assignments within conditions should be avoided since they make the source code difficult to understand. For example, the following source code:

```
if ( (dir = new File(targetDir)).exists() ) {
    // do something
}
``` should be replaced by:

```
dir = new File(targetDir);
if( dir.exists() ) {
    // do something
}
```

Supply Break or Comment in Case Statement

Every time a case falls through and doesn't include a break statement, a comment should be added where the break statement would normally be. The break in the default case is redundant, but it prevents a fall-through error if later another case is added. Thus in the following source code:

```
switch( c ) {
    case 'n':
        result += '\n';
        break;
    case 'r':
        result += '\r';
        break;
    case '\"':
        someFlag = true;
    case '\'':
        result += c;
        break;
    // some more code...
}
``` a /* falls through */ comment should be added, as follows:

```
switch( c ) {
    case 'n':
        result += '\n';
        break;
    case 'r':
        result += '\r';
        break;
    case '\"':
        someFlag = true;
        /* falls through */;
    case '\'':
        result += c;
        break;
    // some more code...
}
```

Use 'equals' Instead of '='

The '=' operator is used on strings to check if two string objects are identical. However, in most cases, one would like to check if two strings have the same value. In these cases, the 'equals' method should be used. Thus, the following source code:

```
void func (String str1, String str2) {
    if(str1 == str2) {
        // do something
    }
}
``` should be replaced by:

```
void func (String str1, String str2) {
    if( str1.equals(str2)) {
        // do something
    }
}
```

Use 'L' Instead Of 'l' at the end of integer constant

It is difficult to distinguish between lower case letter 'l' and digit '1'. As far as the letter 'l' can be used as a long modifier at the end of integer constant, it can be mixed with the digit. Thus, it is better to use an uppercase 'L'. In the following example:

```
void func () {
    long var = 0x0001111l;
}
``` the trailing 'l' letter at the end of integer constants should be replaced with 'L,' as follows:

```
void func () {
    long var = 0x0001111L;
}
```

Use of the 'Synchronized' Modifier

The 'synchronized' modifier on methods can sometimes cause confusion during maintenance and debugging. This rule recommends avoiding the use of this modifier and encourages using 'synchronized' statements instead. Thus, in the following source code:

```
class UOSM {
    public synchronized void method () {
        // do something
    }
}
``` synchronized statements should be used instead of synchronized methods, as follows:

```
class UOSM {
    public void method () {
        synchronized(this) {
            // do something
        }
    }
}
```

SUPERFLUOUS CONTENT

Duplicate Import Declarations

There should be only one import declaration that imports a particular class/package. The following source code violates this audit by containing multiple import declarations for java.io.* and java.sql.time:

```
package audit;
import java.io.*;
import java.io.*;
import java.sql.Time;
import java.sql.Time;
class DID {
}
```

To correct the above code, duplicate declarations should be deleted.

Don't Import the Package the Source File Belongs To

No. classes or interfaces need to be imported from the package that the source code file belongs to. Everything in that package is available without explicit import statements. Thus, the following source code contains the unnecessary import of "audit":

```
package audit;
import java.awt.*;
import audit.*;
public class DIPSFBT {
}
```

To correct the above code, the unnecessary import statement should be deleted.

Explicit Import of the java.lang Classes

Explicit import of classes from the package 'java.lang' should not be performed. Thus, in the following source code, the unnecessary import of "java.lang.*" should be deleted:

```
package audit;
import java.lang.*;
class EIOJLC {}
```

Equality Operations on Boolean Arguments

Avoid performing equality operations on boolean operands. True and false literals should not be used in conditional clauses, as shown below:

```
int oper (boolean bOk) {
    if(bOk) {
        return 1;
    }
    while ( bOk == true ) {
        // do something
    }
    return ( bOk == false )? 1 : 0;
}
```

The above source code should be replaced with the following:

```
int oper (boolean bOk) {
    if(bOk) {
        return 1;
    }
    while ( bOk) {
        // do something
    }
    return( !bOk) ? 1 : 0;
}
```

Imported Items must be Used

It is not legal to import a class or an interface and never use it. This audit checks classes and interfaces that are explicitly imported with their names, not those with import of a complete package, i.e., using an asterisk. If unused class and interface imports are omitted, the amount of meaningless source code is reduced, thus the amount of code to be understood by a reader is minimized. Thus, the unnecessary import of "stack" in the following source code should be deleted:

```
import java.awt.*;
import java.util.Dictionary;
import java.util.Hashtable;
import java.util.Stack;
import java.util.Vector;
class IIMBU {
    Dictionary dict;
    void func (Vector vec) {
        Hashtable ht;
        // do something
    }
}
```

Unnecessary Casts

This audit checks for the use of type casts that are not necessary. A cast is a Java™ language construct that performs a narrowing conversion. Thus, in the following example the cast "(elephant) el" is not necessary since el is already defined as type elephant:

```
class Animal {}
class Elephant extends Animal {
    void func () {
        int i;
        float f = (float) i;
        Elephant e1;
        Elephant e2 = (Elephant) e1;
        Animal a;
        Elephant e;
        a = (Animal) e;
    }
}
```

In the above example, the unnecessary cast should be deleted to improve readability.

Unnecessary 'Instanceof' Evaluations

This audit determines whether the runtime type of the left-hand side expression is the same as the one specified on the right-hand side. Thus, in the following source code, the "if-loops" are unnecessary since both statements within the if loop are defined to be true. In particular, "Animal animal" defines animal as type Animal, "Elephant elephant" defines elephant as type Elephant, and "class Elephant extends Animal { }" defines Elephant to be the same type as Animal. Thus, elephant is also defined as type "Animal."

```
class UIOE {
    void operation () {
        Animal animal;
        Elephant elephant;
        if( animal instanceof Animal) {
            doSomething1(animal);
        }
        if( elephant instanceof Animal) {
            doSomething2(elephant);
        }
    }
}
class Animal {}
class Elephant extends Animal {}
```

To correct the above code, the if-loops can be removed, as follows:

```
class UIOE {
    void operation () {
        Animal animal;
        Elephant elephant;
        doSomething1(animal);
        doSomething2(elephant);
    }
}
class Animal {}
class Elephant extends Animal {}
```

Unused Local Variables and Formal Parameters

Local variables and formal parameters declarations must be used. Thus, in the following source code, the unused local variables and formal parameters should not be used.

```
int oper (int unused_param, int used_param) {
    int unused_var;
    return 2 * used_param;
}
```

Use of Obsolete Interface Modifier

The modifier 'abstract,' as shown in the following code, is considered obsolete and should not be used:

abstract interface UOOIM { }

The above source code should be replaced by the following:

interface UOOIM { }

Use of Unnecessary Interface Member Modifiers

All interface operations are implicitly public and abstract. All interface attributes are implicitly public, final and static. Thus, the following source code contains unnecessary interface member modifiers:

```
interface UOUIMM {
    int attr1;
    public final static int ATTR2;
    void oper1 ();
    public abstract void oper2 ();
}
```

The above code may be corrected, as follows:

```
interface UOUIMM {
    int attr1;
    final static int ATTR2;
    void oper1 ();
    void oper2 ();
}
```

Unused Private Class Member

An unused class member might indicate a logical flaw in the program. The class declaration has to be reconsidered in order to determine the need of the unused member(s). Thus, in the following source code, the unnecessary members, i.e., "bad_attr" and "bad_oper( )," should be removed.

```
class UPCM {
    private int bad_attr;
    private int good_attr;
    private void bad_oper () {
        // do something . . . ;
    }
    private void good_oper1 () {
        good_attr = 10;
    }
    public void good_oper2() {
        good_oper1();
    }
}
```

Unnecessary Return Statement Parentheses

A return statement with a value should not use parentheses unless it makes the return value more obvious in some way. For example, the following source code violates this audit:

```
return;
return (myDisk.size());
return (sizeOk ? size: defaultSize);
``` and should be replaced by:

```
return;
return myDisk.size();
return (sizeOk ? size : defaultSize);
```

Locating Source Code Referenced by Verification Tool

The QA module is a verification tool. Conventional compilers are also verification tools, which provide messages to the user if an error is detected within the source code. The software development tool in accordance with methods and systems consistent with the present invention uses the error message from the verification tool to locate the source code corresponding to the message. Thus, the developer can use the improved software development tool to determine which line of source code corresponds to an error message from a verification tool. The verification tool may be part of the software development tool, or it may be external to the software development tool.

Figure 20A:
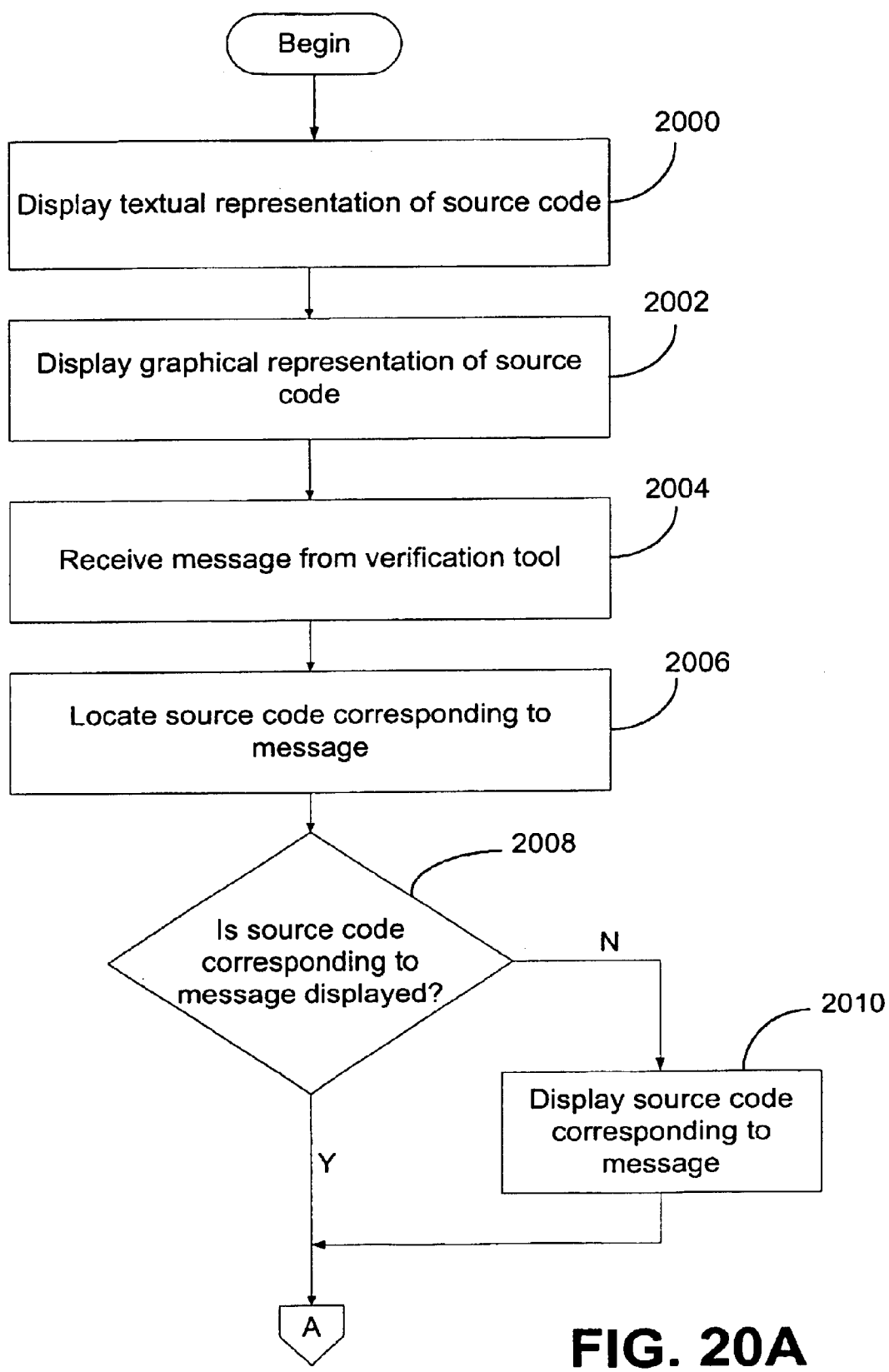
FIGS. 20A and B depict a flow diagram of the steps performed by the software development tool in FIG. 2 when locating source code related to a message from a verification tool.
Figure 21:
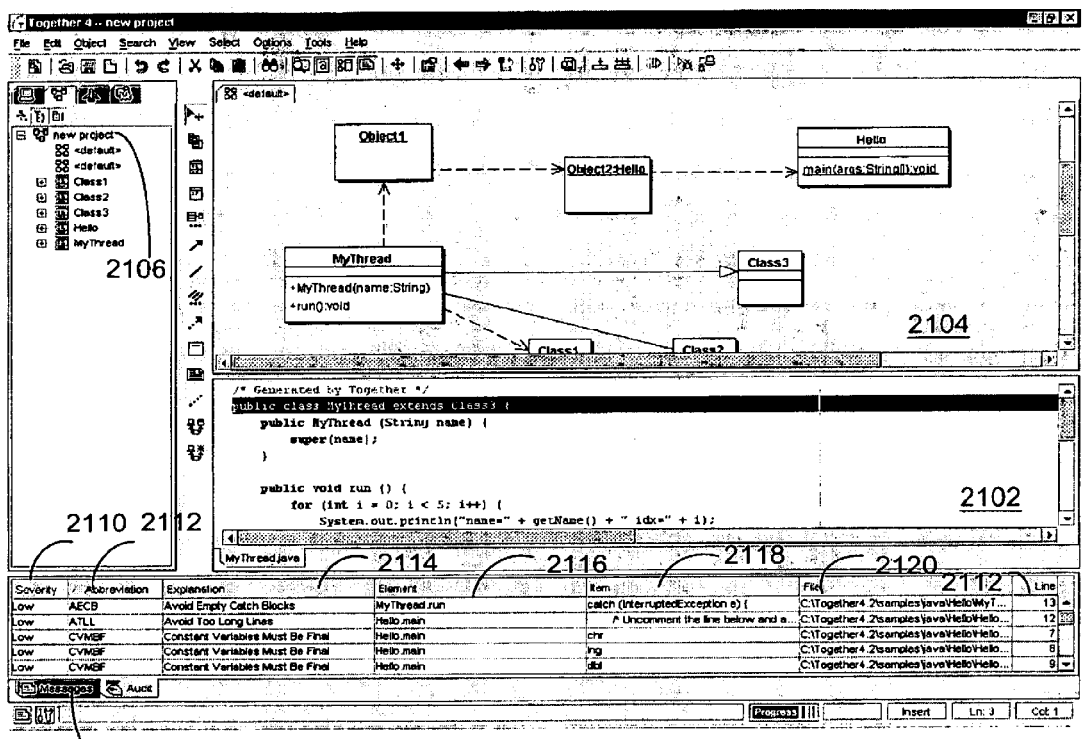
FIG. 21 depicts a user interface displayed by the software development tool depicted in FIG. 2, where the user interface displays a message from a verification tool.

FIGS. 20A and B depict a flow diagram illustrating how the software development tool allows a developer to quickly locate source code referenced by a verification tool. The first step performed by the software development tool is to display the textual representation of the source code in a project (step 2000 in FIG. 20A). The software development tool simultaneously displays the graphical representation of the source code in the project (step 2002). For example, FIG. 21 depicts screen 2100 with both a textual representation 2102 and a graphical representation 2104 of a project 2106. The screen 2100 also displays the error messages 2108 received from the audit option of the QA module. The error messages 2108 include the severity 2110 of the message, the abbreviation 2112 used to identify the message, an explanation 2114 of the message, the element 2116 in which the error occurs, the item 2118 to which the error refers, the file 2120 in which the error occurs, and the line number 2122 of the source code where the error occurs.

The choices for the severity 2110 are low, normal, and high. An example of an audit error message having low severity is "Avoid Too Long Files" ("ATLF"), which occurs when a file contains more than 2000 lines. According to standard code conventions for the Java™ programming language, having more than 2000 lines are cumbersome and should be avoided. Because this audit identifies a suggested format that will not affect the compilation or execution of the source code, it is considered a low severity message. The explanation 2114 of this message is "Avoid Too Long Files," and the message uses the abbreviation 2112 "ATLF." This message relates to a file that contains more than 2000 lines. Thus, the item 2118 to which the message occurs identifies the file name. The file 2120 in which the error occurs also identifies the same file, but includes the path to the file with the file name. With the ATLF audit, the line number 2122 of the source code where the error occurs is 2001 because the audit feature will not identify this error until it reaches the 2001st line of the source code. An example of a "normal" severity message is "Use Abbreviated Assignment Operator" ("UAAO"). The abbreviated assignment operator is preferred in order to write programs more rapidly and because some compilers run faster using abbreviated assignment operators. Although the failure to use the abbreviated assignment operator may slow the compilation of the source code, it will not prevent the program from compiling or executing properly, and is thus not a high severity message. Because of its effect on the compilation time, however, the failure to use the abbreviated assignment operator is considered a normal severity message rather than a low severity message. Finally, a high priority message is one that will prevent the source code from executing properly. For example, "Avoid Hiding Inherited Static Methods" ("AHISM") identifies when inherited static operations are hidden by child classes. Thus, if the same term is used to define a class field in both a parent and a child class, the software development tool will use the same definition in both cases because the term is defined more than once within the project, thus making it ambiguous.

Figure 20B:
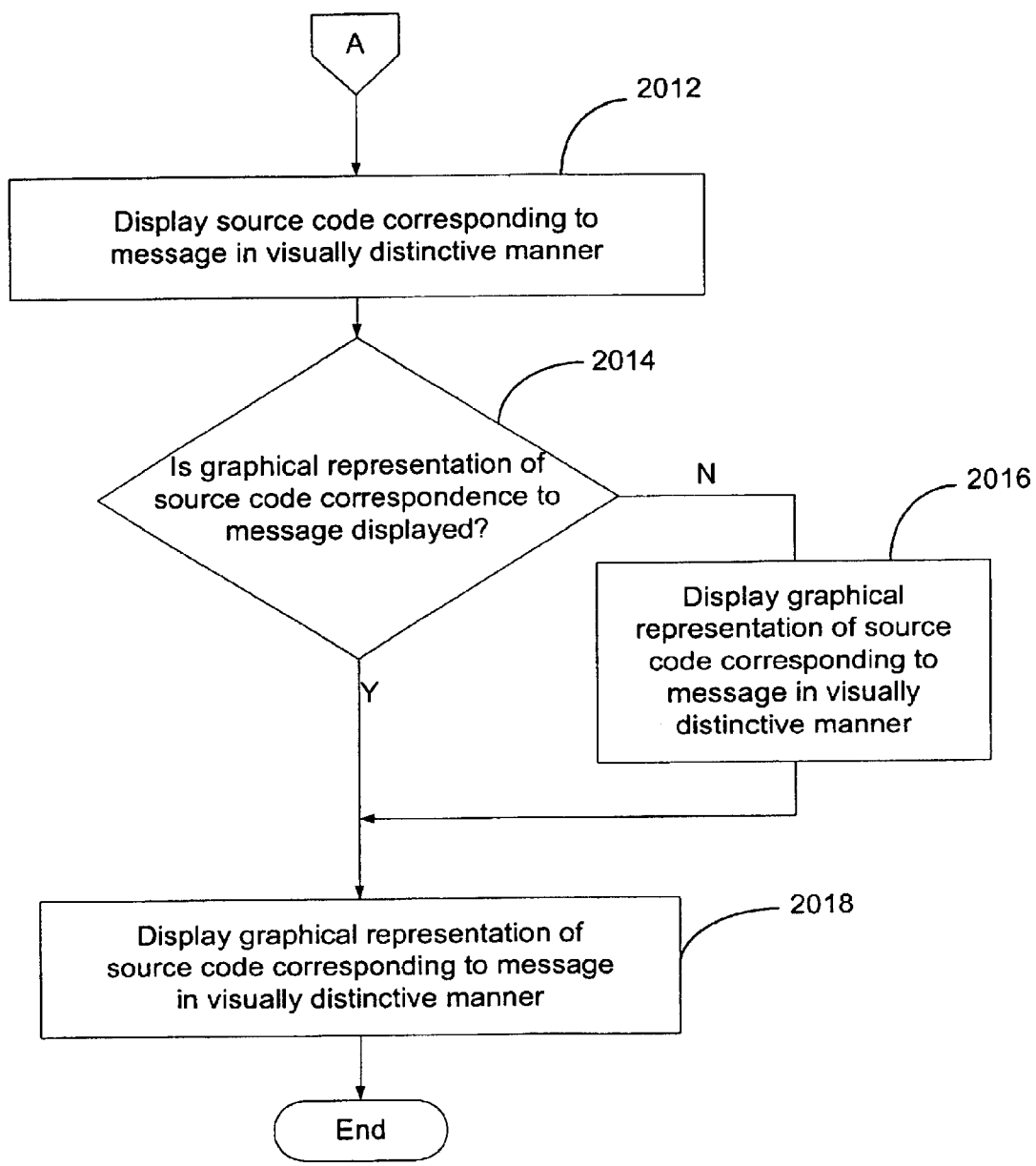
Figure 22:
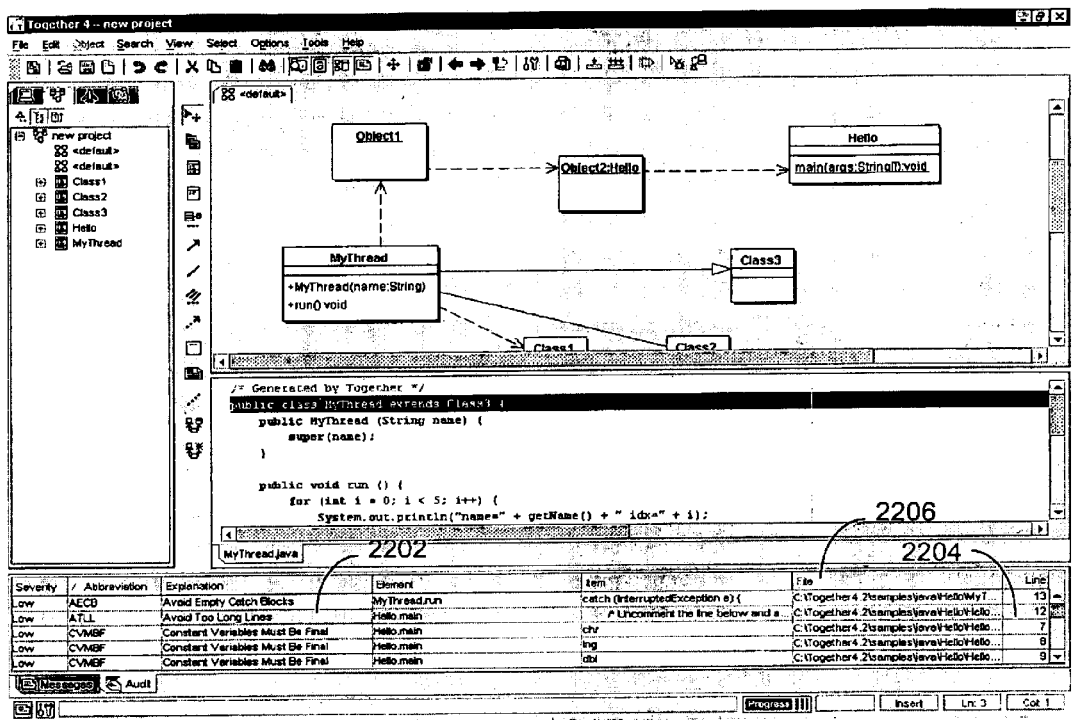
FIG. 22 depicts the user interface in FIG. 21 illustrating the selection of a message.
Figure 23:
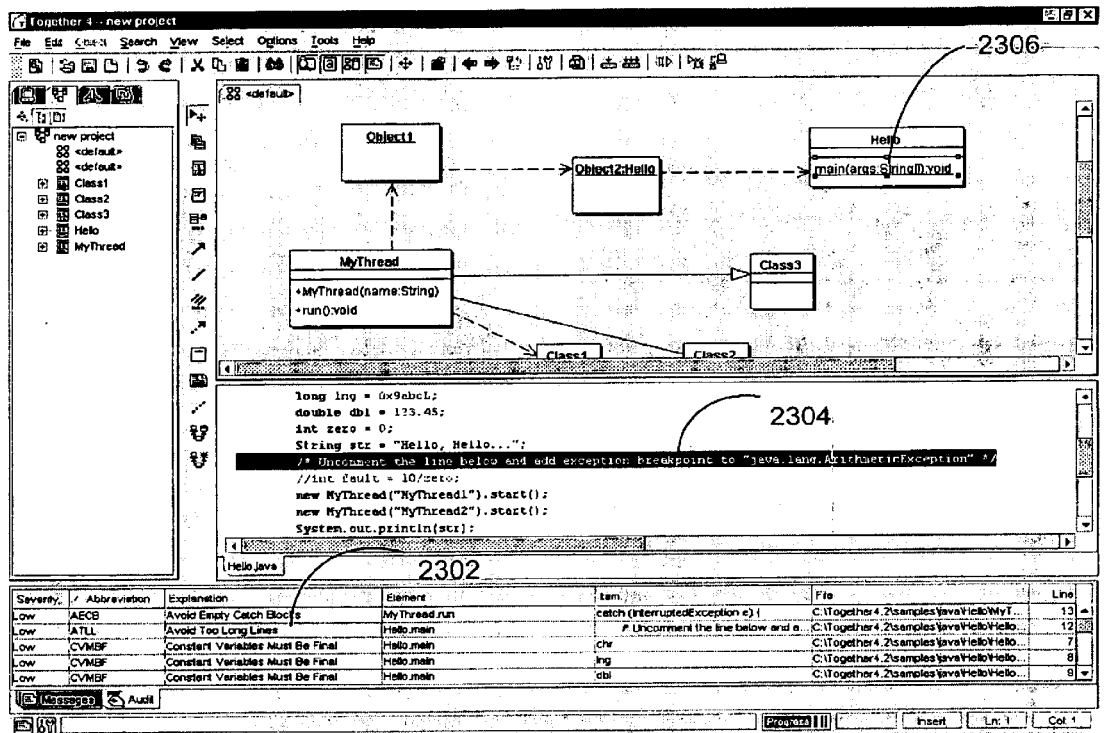
FIG. 23 depicts the user interface in FIG. 22 after the selection of a message.

Returning to the flow diagram in FIG. 20A, when a developer chooses one of the messages 2108, the software development tool receives the message 2108 from the verification tool (step 2004). As discussed above, the message 2108 includes the file 2120 in which the error occurs and the line number 2122 of the source code where the error occurs. Thus, in the example shown, the software development tool obtains this information and uses it to locate the source code corresponding to the message 2108 (step 2006). If the text of the source code corresponding to the message 2108 is not displayed (step 2008), the software development tool displays the source code corresponding to the message (step 2010). The software development tool then displays the source code corresponding to the message in a visually distinctive manner, e.g., the software development tool may highlight, italicize, or bold the source code, or it may display the code in a different color or with a different color background (step 2012 in FIG. 20B). Thus, if a developer chooses the "Avoids Too Long Lines" message 2202 shown on the screen 2200 in FIG. 22, the software development tool finds line number 2204 located in the file 2206 at C:/Together4.2/samples/java/Hello/Hello . . . , determines that the line is not currently displayed, and displays it in a visually distinctive manner, as shown on the screen 2300 in FIG. 23. The software development tool then determines whether the graphical representation 2306 of the source code corresponding to the message is displayed (step 2014). If the graphical representation is not displayed, the software development tool displays the graphical representation 2306 of the source code corresponding to the message (step 2016). The software development tool then displays the graphical representation 2306 of the source code in a visually distinctive manner, e.g., the software development tool may highlight the graphical representation 2306, change its color, or change the color of its background (step 2018). Thus, in the example shown, the software development tool determines that the graphical representation 2306 of the message is shown, and modifies its representation in a visually distinctive manner.

Although discussed in terms of the audit function of the QA module, the software development tool of the present invention may also use other verification tools to receive messages and locate specific lines of source code referenced by the message. These verification tools may be integrated into the software development tool, as in the case of the QA module, or may be external to the software development tool. Any verification tool known in the art may be used, and any known technique to locate the line of source code may be used.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method in a data processing system for developing source code comprising the steps of:

generating a transient meta model which stores a language-neutral representation of the source code;

displaying a graphical representation of the source code generated from the language-neutral representation in the transient meta model;

receiving a message corresponding to a portion of the source code;

locating the portion of the source code corresponding to the message;

displaying the portion of the source code corresponding to the message in a visually distinctive manner;

determining whether the graphical representation of the portion of the source code corresponding to the message is displayed; and when it is determined that the graphical representation of the portion of the source code corresponding to the message is not displayed, displaying the graphical representation of the portion of the source code corresponding to the message; and modifying the graphical representation of the portion of the source code corresponding to the message in a visually distinctive manner.

2. The method of claim 1, wherein the message is received from a verification tool.

3. The method of claim 2, wherein the verification tool comprises a compiler.

4. The method of claim 2, wherein the verification tool comprises a quality assurance module.

5. The method of claim 1, wherein the message comprises an error message.

6. The method of claim 1, wherein the message comprises a line number of the source code.

7. The method of claim 6, wherein the portion of the source code corresponding to the message is located using the line number.

8. The method of claim 1, wherein the message comprises a name of a file containing the source code.

9. The method of claim 1, wherein the graphical representation comprises a class diagram.

10. A method in a data processing system for developing source code comprising the steps of:

generating a transient meta model which stores a language-neutral representation of the source code;

displaying a graphical representation of the source code generated from the language-neutral representation in the transient meta model;

receiving a message corresponding to a portion of the source code;

locating the portion of the source code corresponding to the message;

displaying the portion of the source code corresponding to the message; and displaying the graphical representation of the portion of the source code corresponding to the message in a visually distinctive manner.

11. The method of claim 10, further comprising the steps of:

detecting an error in the source code; and generating a message reflecting the error.

12. The method of claim 10, wherein the message is received from a verification tool.

13. The method of claim 12, wherein the verification tool comprises a compiler.

14. The method of claim 12, wherein the verification tool comprises a quality assurance module.

15. The method of claim 10, wherein the message comprises an error message.

16. The method of claim 10, wherein the message comprises a line number of the source code.

17. The method of claim 16, wherein the portion of the source code corresponding to the message is located using the line number.

18. The method of claim 10, wherein the message comprises a name of a file containing the source code.

19. The method of claim 10, wherein the graphical representation comprises a class diagram.

20. A method in a data processing system for developing source code comprising the steps of:

generating a transient meta model which stores a language-neutral representation of the source code:

receiving a message corresponding to a portion of the source code; and displaying the graphical representation generated from the language-neutral representation in the transient meta model pertaining to the portion of the source code corresponding to the message in a visually distinctive manner.

21. The method of claim 20, wherein the message is received from a verification tool.

22. The method of claim 21, wherein the verification tool comprises a compiler.

23. The method of claim 21, wherein the verification tool comprises a quality assurance module.

24. The method of claim 20, wherein the message comprises an error message.

25. The method of claim 20, wherein the message comprises a line number of the source code.

26. The method of claim 25, wherein the portion of the source code corresponding to the message is located using the line number.

27. The method of claim 20, wherein the message comprises a name of a file containing the source code.

28. The method of claim 20, wherein the graphical representation comprises a class diagram.

29. The method of claim 20, wherein the message comprises a basic metrics message.

30. The method of claim 29, wherein the basic metrics message comprises a lines of code message.

31. The method of claim 29, wherein the basic metrics message comprises a number of attributes message.

32. The method of claim 29, wherein the basic metrics message comprises a number of classes message.

33. The method of claim 29, wherein the basic metrics message comprises a number of constructors message.

34. The method of claim 29, wherein the basic metrics message comprises a number of import statements message.

35. The method of claim 29, wherein the basic metrics message comprises a number of members message.

36. The method of claim 29, wherein the basic metrics message comprises a number of operations message.

37. The method of claim 20, wherein the message comprises a cohesion metrics message.

38. The method of claim 37, wherein the cohesion metrics message comprises a lack of cohesion message.

39. The method of claim 20, wherein the message comprises a complexity metrics message.

40. The method of claim 39, wherein the complexity metrics message comprises an attribute complexity message.

41. The method of claim 39, wherein the complexity metrics message comprises a cyclomatic complexity message.

42. The method of claim 39, wherein the complexity metrics message comprises a number of remote methods message.

43. The method of claim 39, wherein the complexity metrics message comprises a response for class message.

44. The method of claim 39, wherein the complexity metrics message comprises a weighted methods per class message.

45. The method of claim 20, wherein the message comprises a coupling metrics message.

46. The method of claim 45, wherein the coupling metrics message comprises a coupling between objects message.

47. The method of claim 45 wherein the coupling metrics message comprises a coupling factor message.

48. The method of claim 45, wherein the coupling metrics message comprises a data abstraction coupling message.

49. The method of claim 45, wherein the coupling metrics message comprises a fanout message.

50. The method of claim 20, wherein the message comprises a Halstead metrics message.

51. The method of claim 50, wherein the Halstead metrics message comprises a Halstead difficulty message.

52. The method of claim 50, wherein the Halstead metrics message comprises a Halstead effort message.

53. The method of claim 50, wherein the Halstead metrics message comprises a Halstead program length message.

54. The method of claim 50, wherein the Halstead metrics message comprises a Halstead program vocabulary message.

55. The method of claim 50, wherein the Halstead metrics message comprises a Halstead program volume message.

56. The method of claim 50, wherein the Halstead metrics message comprises a number of operands message.

57. The method of claim 50, wherein the Halstead metrics message comprises a number of operators message.

58. The method of claim 50, wherein the Halstead metrics message comprises a number of unique operands message.

59. The method of claim 50, wherein the Halstead metrics message comprises a number of unique operators message.

60. The method of claim 20, wherein the message comprises an incapsulation metrics message.

61. The method of claim 60, wherein the incapsulation metrics message comprises an attribute hiding factor message.

62. The method of claim 60, wherein the incapsulation metrics message comprises a method hiding factor message.

63. The method of claim 20, wherein the message comprises an inheritance metrics message.

64. The method of claim 63, wherein the inheritance metrics message comprises an attribute inheritance factor message.

65. The method of claim 63, wherein the inheritance metrics message comprises a depth of inheritance hierarchy message.

66. The method of claim 63, wherein the inheritance metrics message comprises a method inheritance factor message.

67. The method of claim 63, wherein the inheritance metrics message comprises a number of child classes message.

68. The method of claim 20, wherein the message comprises a maximum metrics message.

69. The method of claim 68, wherein the maximum metrics message comprises a maximum number of levels message.

70. The method of claim 68, wherein the maximum metrics message comprises a maximum number of parameters message.

71. The method of claim 68, wherein the maximum metrics message comprises a maximum size of operation message.

72. The method of claim 20, wherein the message comprises a polymorphism metrics message.

73. The method of claim 72, wherein the polymorphism metrics message comprises a number of added methods message.

74. The method of claim 72, wherein the polymorphism metrics message comprises a number of overridden methods message.

75. The method of claim 72, wherein the polymorphism metrics message comprises a polymorphism factor message.

76. The method of claim 20, wherein the message comprises a ratio metrics message.

77. The method of claim 76, wherein the ratio metrics message comprises a comment ratio message.

78. The method of claim 76, wherein the ratio metrics message comprises a percentage of package members message.

79. The method of claim 76, wherein the ratio metrics message comprises a percentage of private members message.

80. The method of claim 76, wherein the ratio metrics message comprises a percentage of protected members message.

81. The method of claim 76, wherein the ratio metrics message comprises a percentage of public members message.

82. The method of claim 76, wherein the ratio metrics message comprises a true comment ratio message.

83. The method of claim 20, wherein the message comprises a coding style audits message.

84. The method of claim 83, wherein the coding style audits message comprises an avoid complex initialization or update clause in for loops message.

85. The method of claim 83, wherein the coding style audits message comprises an avoid implementation packages referencing message.

86. The method of claim 83, wherein the coding style audits message comprises an access of static members through objects message.

87. The method of claim 83, wherein the coding style audits message comprises an assignment to formal parameters message.

88. The method of claim 83, wherein the coding style audits message comprises an avoid too long files message.

89. The method of claim 83, wherein the coding style audits message comprises an avoid too long lines message.

90. The method of claim 83, wherein the coding style audits message comprises a complex assignment message.

91. The method of claim 83, wherein the coding style audits message comprises a don't code numerical constants directly message.

92. The method of claim 83, wherein the coding style audits message comprises a don't place multiple statements on the same line message.

93. The method of claim 83, wherein the coding style audits message comprises a don't use the negation operator frequently message.

94. The method of claim 83, wherein the coding style audits message comprises an operator '?:' may not be used message.

95. The method of claim 83, wherein the coding style audits message comprises a parenthesize conditional part of ternary conditional expression message.

96. The method of claim 83, wherein the coding style audits message comprises a put declarations only at the beginning of blocks message.

97. The method of claim 83, wherein the coding style audits message comprises a provide incremental in for-statement or use while-statement message.

98. The method of claim 83, wherein the coding style audits message comprises a replacement for demand imports message.

99. The method of claim 83, wherein the coding style audits message comprises a switch statement should include a default case message.

100. The method of claim 83, wherein the coding style audits message comprises a use abbreviated assignment operator message.

101. The method of claim 83, wherein the coding style audits message comprises a use 'this' explicitly to access class members message.

102. The method of claim 20, wherein the message comprises a critical errors audits message.

103. The method of claim 102, wherein the critical errors audits message comprises an avoid hiding inherited attributes message.

104. The method of claim 102, wherein the critical errors audits message comprises an avoid hiding inherited static methods message.

105. The method of claim 102, wherein the critical errors audits message comprises a command query separation message.

106. The method of claim 102, wherein the critical errors audits message comprises a hiding of names message.

107. The method of claim 102, wherein the critical errors audits message comprises an inaccessible constructor or method matches message.

108. The method of claim 102, wherein the critical errors audits message comprises a multiple visible declarations with same name message.

109. The method of claim 102, wherein the critical errors audits message comprises an overriding a non-abstract method with an abstract method message.

110. The method of claim 102, wherein the critical errors audits message comprises an overriding a private method message.

111. The method of claim 102, wherein the critical errors audits message comprises an overloading within a subclass message.

112. The method of claim 102, wherein the critical errors audits message comprises a use of static attribute for initialization message.

113. The method of claim 20, wherein the message comprises a declaration style audits message.

114. The method of claim 113, wherein the declaration style audits message comprises a badly located array declarators message.

115. The method of claim 113, wherein the declaration style audits message comprises a constant private attributes must be final message.

116. The method of claim 113, wherein the declaration style audits message comprises a constant variables must be final message.

117. The method of claim 113, wherein the declaration style audits message comprises a declare variables in one statement each message.

118. The method of claim 113, wherein the declaration style audits message comprises an instantiated classes should be final message.

119. The method of claim 113, wherein the declaration style audits message comprises a list all public and package members first message.

120. The method of claim 113, wherein the declaration style audits message comprises an order of class members declaration message.

121. The method of claim 113, wherein the declaration style audits message comprises an order of appearance of modifiers message.

122. The method of claim 113, wherein the declaration style audits message comprises a put the main function last message.

123. The method of claim 113, wherein the declaration style audits message comprises a place public class first message.

124. The method of claim 20, wherein the message comprises a documentation audits message.

125. The method of claim 124, wherein the documentation audits message comprises a bad tag in JavaDoc comments message.

126. The method of claim 124, wherein the documentation audits message comprises a distinguish between JavaDoc and ordinary comments message.

127. The method of claim 124, wherein the documentation audits message comprises a provide file comments message.

128. The method of claim 124, wherein the documentation audits message comprises a provide JavaDoc comments message.

129. The method of claim 20, wherein the message comprises a naming style audits message.

130. The method of claim 129, wherein the naming style audits message comprises a class name must match its file name message.

131. The method of claim 129, wherein the naming style audits message comprises a group operations with same name together message.

132. The method of claim 129, wherein the naming style audits message comprises a naming conventions message.

133. The method of claim 129, wherein the naming style audits message comprises a names of exception classes message.

134. The method of claim 129, wherein the naming style audits message comprises a use conventional variable names message.

135. The method of claim 20, wherein the message comprises a performance audits message.

136. The method of claim 135, wherein the performance audits message comprises an avoid declaring variables inside loops message.

137. The method of claim 135, wherein the performance audits message comprises an append to string within a loop message.

138. The method of claim 135, wherein the performance audits message comprises a complex loop expressions message.

139. The method of claim 20, wherein the message comprises a possible error audits message.

140. The method of claim 139, wherein the possible error audits message comprises an avoid empty catch blocks message.

141. The method of claim 139, wherein the possible error audits message comprises an avoid public and package attributes message.

142. The method of claim 139, wherein the possible error audits message comprises an avoid statements with empty body message.

143. The method of claim 139, wherein the possible error audits message comprises an assignment to for-loop variables message.

144. The method of claim 139, wherein the possible error audits message comprises a don't compare floating point types message.

145. The method of claim 139, wherein the possible error audits message comprises an enclosing body within a block message.

146. The method of claim 139, wherein the possible error audits message comprises an explicitly initialize all variables message.

147. The method of claim 139, wherein the possible error audits message comprises a method finalize( ) doesn't call super.finalize( ) message.

148. The method of claim 139, wherein the possible error audits message comprises a mixing logical operators without parentheses message.

149. The method of claim 139, wherein the possible error audits message comprises a no assignments in conditional expressions message.

150. The method of claim 139, wherein the possible error audits message comprises a supply break or comment in case statement message.

151. The method of claim 139, wherein the possible error audits message comprises a use 'equals' instead of '=' message.

152. The method of claim 139, wherein the possible error audits message comprises a use 'L' instead of 'l' at the end of integer constant message.

153. The method of claim 139, wherein the possible error audits message comprises a use of the 'synchronized' modifier message.

154. The method of claim 20, wherein the message comprises a superfluous content audits message.

155. The method of claim 154, wherein the superfluous content audits message comprises a duplicate import declarations message.

156. The method of claim 154, wherein the superfluous content audits message comprises a don't import the package the source file belongs to message.

157. The method of claim 154, wherein the superfluous content audits message comprises an explicit import of the java.lang classes message.

158. The method of claim 154, wherein the superfluous content audits message comprises an equality operations on boolean arguments message.

159. The method of claim 154, wherein the superfluous content audits message comprises an imported items must be used message.

160. The method of claim 154, wherein the superfluous content audits message comprises an unnecessary casts message.

161. The method of claim 154, wherein the superfluous content audits message comprises an unnecessary 'instanceof' evaluations message.

162. The method of claim 154, wherein the superfluous content audits message comprises an unused local variables and formal parameters message.

163. The method of claim 154, wherein the superfluous content audits message comprises a use of obsolete interface modifier message.

164. The method of claim 154, wherein the superfluous content audits message comprises a use of unnecessary interface member modifiers message.

165. The method of claim 154, wherein the superfluous content audits message comprises an unused private class member message.

166. The method of claim 154, wherein the superfluous content audits message comprises an unnecessary return statement parentheses message.

167. A method in a data processing system for developing source code comprising the steps of:
    generating a transient meta model which stores a language-neutral representation of the source code;
    displaying a graphical representation of the source code generated from the language-neutral representation in the transient meta model;
    detecting an error in the source code;
    generating a message reflecting the error;
    locating a portion of the source code corresponding to the message;
    displaying the portion of the source code corresponding to the message in a visually distinctive manner;
    determining whether the graphical representation of the portion of the source code corresponding to the message is displayed; and
    when it is determined that the graphical representation of the portion of the source code corresponding to the message is not displayed, displaying the graphical representation of the portion of the source code corresponding to the message; and
    modifying the graphical representation of the portion of the source code corresponding to the message in a visually distinctive manner.

168. The method of claim 167, wherein the message is generated by a verification tool.

169. The method of claim 168, wherein the verification tool comprises a compiler.

170. The method of claim 168, wherein the verification tool comprises a quality assurance module.

171. The method of claim 167, wherein the message comprises an error message.

172. The method of claim 167, wherein the message comprises a line number of the source code.

173. The method of claim 172, wherein the portion of the source code corresponding to the message is located using the line number.

174. The method of claim 167, wherein the message comprises a name of a file containing the source code.

175. The method of claim 167, wherein the graphical representation comprises a class diagram.

176. A method in a data processing system for developing source code comprising the steps of:
    generating a transient meta model which stores a language-neutral representation of the source code;
    displaying a graphical representation of the source code generated from the language-neutral representation in the transient meta model;
    detecting an error in the source code;
    generating a message reflecting the error;
    locating a portion of the source code corresponding to the message;
    displaying the portion of the source code corresponding to the message; and
    displaying the graphical representation of the portion of the source code corresponding to the message in a visually distinctive manner.

177. The method of claim 176, wherein the message is generated by a verification tool.

178. The method of claim 177, wherein the verification tool comprises a compiler.

179. The method of claim 177, wherein the verification tool comprises a quality assurance module.

180. The method of claim 176, wherein the message comprises an error message.

181. The method of claim 176, wherein the message comprises a line number of the source code.

182. The method of claim 181, wherein the portion of the source code corresponding to the message is located using the line number.

183. The method of claim 176, wherein the message comprises a name of a file containing the source code.

184. The method of claim 176, wherein the graphical representation comprises a class diagram.

185. A method in a data processing system for developing source code comprising the steps of:
    generating a transient meta model which stores a language-neutral representation of the source code;
    detecting an error in the source code;
    generating a message reflecting the error; and
    displaying the graphical representation generated from the language-neutral representation in the transient meta model pertaining to a portion of the source code corresponding to the message in a visually distinctive manner.

186. The method of claim 185, wherein the message is generated by a verification tool.

187. The method of claim 186, wherein the verification tool comprises a compiler.

188. The method of claim 186, wherein the verification tool comprises a quality assurance module.

189. The method of claim 185, wherein the message comprises an error message.

190. The method of claim 185, wherein the message comprises a line number of the source code.

191. The method of claim 190, wherein the portion of the source code corresponding to the message is located using the line number.

192. The method of claim 185, wherein the message comprises a name of a file containing the source code.

193. The method of claim 185, wherein the graphical representation comprises a class diagram.

194. A computer-readable medium containing instructions for controlling a data processing system to perform a method, the data processing system having source code, the method comprising the steps of:

generating a transient meta model which stores a language-neutral representation of the source code;

displaying a graphical representation of the source code generated from the language-neutral representation in the transient meta model;

receiving a message corresponding to a portion of the source code;

locating the portion of the source code corresponding to the message;

displaying the portion of the source code corresponding to the message in a visually distinctive manner;

determining whether the graphical representation of the portion of the source code corresponding to the message is displayed; and when it is determined that the graphical representation of the portion of the source code corresponding to the message is not displayed, displaying the graphical representation of the portion of the source code corresponding to the message; and modifying the graphical representation of the portion of the source code corresponding to the message in a visually distinctive manner.

195. The computer-readable medium of claim 194, wherein the message is received from a verification tool.

196. The computer-readable medium of claim 195, wherein the verification tool comprises a compiler.

197. The computer-readable medium of claim 195, wherein the verification tool comprises a quality assurance module.

198. The computer-readable medium of claim 194, wherein the message comprises an error message.

199. The computer-readable medium of claim 194, wherein the message comprises a line number of the source code.

200. The computer-readable medium of claim 199, wherein the portion of the source code corresponding to the message is located using the line number.

201. The computer-readable medium of claim 194, wherein the message comprises a name of a file containing the source code.

202. The computer-readable medium of claim 194, wherein the graphical representation comprises a class diagram.

203. A computer-readable medium containing instructions for controlling a data processing system to perform a method, the data processing system having source code, the method comprising the steps of:

generating a transient meta model which stores a language-neutral representation of the source code;

displaying a graphical representation of the source code generated from the language-neutral representation in the transient meta model;

receiving a message corresponding to a portion of the source code;

locating the portion of the source code corresponding to the message;

displaying the portion of the source code corresponding to the message; and displaying the graphical representation of the portion of the source code corresponding to the message in a visually distinctive manner.

204. The computer-readable medium of claim 203, wherein the method further comprises the steps of:

detecting an error in the source code; and generating a message reflecting the error.

205. The computer-readable medium of claim 203, wherein the message is received from a verification tool.

206. The computer-readable medium of claim 205, wherein the verification tool comprises a compiler.

207. The computer-readable medium of claim 205, wherein the verification tool comprises a quality assurance module.

208. The computer-readable medium of claim 203, wherein the message comprises an error message.

209. The computer-readable medium of claim 203, wherein the message comprises a line number of the source code.

210. The computer-readable medium of claim 209, wherein the portion of the source code corresponding to the message is located using the line number.

211. The computer-readable medium of claim 203, wherein the message comprises a name of a file containing the source code.

212. The computer-readable medium of claim 203, wherein the graphical representation comprises a class diagram.

213. A computer-readable medium containing instructions for controlling a data processing system to perform a method, the data processing system having source code, the method comprising the steps of:

generating a transient meta model which stores a language-neutral representation of the source code;

receiving a message corresponding to a portion of the source code; and displaying the graphical representation generated from the language-neutral representation in the transient meta model pertaining to the portion of the source code corresponding to the message in a visually distinctive manner.

214. The computer-readable medium of claim 213, wherein the message is received from a verification tool.

215. The computer-readable medium of claim 214, wherein the verification tool comprises a compiler.

216. The computer-readable medium of claim 214, wherein the verification tool comprises a quality assurance module.

217. The computer-readable medium of claim 213, wherein the message comprises an error message.

218. The computer-readable medium of claim 213, wherein the message comprises a line number of the source code.

219. The computer-readable medium of claim 218, wherein the portion of the source code corresponding to the message is located using the line number.

220. The computer-readable medium of claim 213, wherein the message comprises a name of a file containing the source code.

221. The computer-readable medium of claim 213, wherein the graphical representation comprises a class diagram.

222. A computer-readable medium containing instructions for controlling a data processing system to perform a method, the data processing system having source code, the method comprising the steps of:

generating a transient meta model which stores a language-neutral representation of the source code;

displaying a graphical representation of the source code generated from the language-neutral representation in the transient meta model;

detecting an error in the source code;

generating a message reflecting the error;

locating a portion of the source code corresponding to the message;

displaying the portion of the source code corresponding to the message in a visually distinctive manner;

determining whether the graphical representation of the portion of the source code corresponding to the message is displayed; and when it is determined that the graphical representation of the portion of the source code corresponding to the message is not displayed, displaying the graphical representation of the portion of the source code corresponding to the message; and modifying the graphical representation of the portion of the source code corresponding to the message in a visually distinctive manner.

223. The computer-readable medium of claim 222, wherein the message is generated by a verification tool.

224. The computer-readable medium of claim 223, wherein the verification tool comprises a compiler.

225. The computer-readable medium of claim 223, wherein the verification tool comprises a quality assurance module.

226. The computer-readable medium of claim 222, wherein the message comprises an error message.

227. The computer-readable medium of claim 222, wherein the message comprises a line number of the source code.

228. The computer-readable medium of claim 227, wherein the portion of the source code corresponding to the message is located using the line number.

229. The computer-readable medium of claim 222, wherein the message comprises a name of a file containing the source code.

230. The computer-readable medium of claim 222, wherein the graphical representation comprises a class diagram.

231. A computer-readable medium containing instructions for controlling a data processing system to perform a method, the data processing system having source code, the method comprising the steps of:

generating a transient meta model which stores a language-neutral representation of the source code;

displaying a graphical representation of the source code generated from the language-neutral representation in the transient meta model;

detecting an error in the source code;

generating a message reflecting the error;

locating a portion of the source code corresponding to the message;

displaying the portion of the source code corresponding to the message; and displaying the graphical representation of the portion of the source code corresponding to the message in a visually distinctive manner.

232. The computer-readable medium of claim 231, wherein the message is generated by a verification tool.

233. The computer-readable medium of claim 232, wherein the verification tool comprises a compiler.

234. The computer-readable medium of claim 232, wherein the verification tool comprises a quality assurance module.

235. The computer-readable medium of claim 231, wherein the message comprises an error message.

236. The computer-readable medium of claim 231, wherein the message comprises a line number of the source code.

237. The computer-readable medium of claim 236, wherein the portion of the source code corresponding to the message is located using the line number.

238. The computer-readable medium of claim 231, wherein the message comprises a name of a file containing the source code.

239. The computer-readable medium of claim 231, wherein the graphical representation comprises a class diagram.

240. A computer-readable medium containing instructions for controlling a data processing system to perform a method, the data processing system having source code, the method comprising the steps of:

generating a transient meta model which stores a language-neutral representation of the source code;

detecting an error in the source code;

generating a message reflecting the error; and displaying the graphical representation generated from the language-neutral representation in the transient meta model pertaining to a portion of the source code corresponding to the message in a visually distinctive manner.

241. The computer-readable medium of claim 240, wherein the message is generated by a verification tool.

242. The computer-readable medium of claim 241, wherein the verification tool comprises a compiler.

243. The computer-readable medium of claim 241, wherein the verification tool comprises a quality assurance module.

244. The computer-readable medium of claim 240, wherein the message comprises an error message.

245. The computer-readable medium of claim 240, wherein the message comprises a line number of the source code.

246. The computer-readable medium of claim 245, wherein the portion of the source code corresponding to the message is located using the line number.

247. The computer-readable medium of claim 240, wherein the message comprises a name of a file containing the source code.

248. The computer-readable medium of claim 240, wherein the graphical representation comprises a class diagram.

249. A data processing system comprising:

a secondary storage device further comprising source code;

a memory device further comprising a program that generates a transient meta model which stores a language-neutral representation of the source code, that displays a graphical representation of the source code generated from the language-neutral representation in the transient meta model, that receives a message corresponding to a portion of the source code, that locates the portion of the source code corresponding to the message, that displays the portion of the source code corresponding to the message, and that displays the graphical representation of the portion of the source code corresponding to the message in a visually distinctive manner; and a processor for running the program.

250. The data processing system of claim 249, wherein the program further detects an error in the source code, and generates a message reflecting the error.

251. The data processing system of claim 249, wherein the message is received from a verification tool.

252. The data processing system of claim 251, wherein the verification tool comprises a compiler.

253. The data processing system of claim 251, wherein the verification tool comprises a quality assurance module.

254. The data processing system of claim 249, wherein the message comprises an error message.

255. The data processing system of claim 249, wherein the message comprises a line number of the source code.

256. The data processing system of claim 255, wherein the portion of the source code corresponding to the message is located using the line number.

257. The data processing system of claim 249, wherein the message comprises a name of a file containing the source code.

258. The data processing system of claim 249, wherein the graphical representation comprises a class diagram.

259. A data processing system comprising:

a secondary storage device further comprising source code;

a memory device further comprising a program that generates a transient meta model which stores a language-neutral representation of the source code, that displays a graphical representation of the source code generated from the language-neutral representation in the transient meta model, that detects an error in the source code, that generates a message reflecting the error, that locates a portion of the source code corresponding to the message, that displays the portion of the source code corresponding to the message, and that displays the graphical representation of the portion of the source code corresponding to the message in a visually distinctive manner; and a processor for running the program.

260. The data processing system of claim 259, wherein the message is generated by a verification tool.

261. The data processing system of claim 260, wherein the verification tool comprises a compiler.

262. The data processing system of claim 260, wherein the verification tool comprises a quality assurance module.

263. The data processing system of claim 259, wherein the message comprises an error message.

264. The data processing system of claim 259, wherein the message comprises a line number of the source code.

265. The data processing system of claim 264, wherein the portion of the source code corresponding to the message is located using the line number.

266. The data processing system of claim 259, wherein the message comprises a name of a file containing the source code.

267. The data processing system of claim 259, wherein the graphical representation comprises a class diagram.

268. A system for developing source code comprising:

means for generating a transient meta model which stores a language-neutral representation of the source code;

means for receiving a message corresponding to a portion of the source code; and means for displaying the graphical representation generated from the language-neutral representation in the transient meta model pertaining to the portion of the source code corresponding to the message in a visually distinctive manner.

* * * * *

UNITED STATES PATENT AND TRADEMARK OFFICE
CERTIFICATE OF CORRECTION

PATENT NO. : 6,983,446 B2
DATED : January 3, 2006
INVENTOR(S) : Charisius et al.

It is certified that error appears in the above-identified patent and that said Letters Patent is hereby corrected as shown below:

Column 7,
Line 61, "java" should read -- .java --.

Column 9,
Line 21, "pseudo code" should read -- pseudocode --.

Column 18,
Line 67, "occurning" should read -- occurring --.

Column 29,
Line 31, "intparam" should read -- int param --.

Column 37,
Line 44, "renmae" should read -- rename --.

Column 40,
Line 23, "Attn1(){" should read -- Attr1(){ --.

Column 43,
Lines 63 and 65, "equal" should be replaced with -- = --.

Signed and Sealed this

Fourth Day of April, 2006

JON W. DUDAS
*Director of the United States Patent and Trademark Office*